US012780677B2

(12) United States Patent
Kang et al.

(10) Patent No.: US 12,780,677 B2
(45) Date of Patent: Nov. 3, 2026

(54) CARBONATE AGGREGATE COMPOSITIONS AND METHODS OF MAKING AND USING THE SAME

(71) Applicant: Blue Planet Systems Corporation, Los Gatos, CA (US)

(72) Inventors: Seung-Hee Kang, Los Gatos, CA (US); Mohamad El Hajj Younes, Los Gatos, CA (US); Jacob Schneider, Los Gatos, CA (US); Brent R. Constantz, Los Gatos, CA (US)

(73) Assignee: Blue Planet Systems Corporation, Los Gatos, CA (US)

(*) Notice: Subject to any disclaimer, the term of this patent is extended or adjusted under 35 U.S.C. 154(b) by 500 days.

(21) Appl. No.: 17/297,278

(22) PCT Filed: Jan. 23, 2020

(86) PCT No.: PCT/US2020/014817
§ 371 (c)(1),
(2) Date: May 26, 2021

(87) PCT Pub. No.: WO2020/154518
PCT Pub. Date: Jul. 30, 2020

(65) Prior Publication Data

US 2021/0403336 A1 Dec. 30, 2021

Related U.S. Application Data

(60) Provisional application No. 62/795,986, filed on Jan. 23, 2019.

(51) Int. Cl.
*C01F 11/18* (2006.01)
*C01F 5/24* (2006.01)
(Continued)

(52) U.S. Cl.
CPC .............. *C01F 11/185* (2013.01); *C01F 5/24* (2013.01); *C04B 7/367* (2013.01); *C04B 22/10* (2013.01); *C04B 2111/00019* (2025.05)

(58) Field of Classification Search
CPC ........ C01F 11/185; C01F 5/24; C01F 11/181; C04B 14/26; C04B 20/023; C04B 22/10;
(Continued)

(56) References Cited

U.S. PATENT DOCUMENTS 6,761,864 B2 7/2004 Jasra et al.
7,727,374 B2 6/2010 Jones
(Continued)

FOREIGN PATENT DOCUMENTS

CN 1285140 A 2/2001
CN 101765571 A 6/2010
(Continued)

OTHER PUBLICATIONS

Xue et al. The effect of the intimate structure of the solid binder on material viscosity during drum granulation Powder Technology; vol. 253, Feb. 2014, pp. 584-589 (Year: 2014).*
(Continued)

*Primary Examiner* — Shuangyi Abu Ali
(74) *Attorney, Agent, or Firm* — Melissa L. Nakamoto; Peter W. Schroen; Bret E. Field

(57) ABSTRACT

Methods of making carbonate aggregates are provided. Aspects of the methods include: preparing a carbonate slurry, subjecting the carbonate slurry to rotational action, e.g., by introducing the carbonate slurry (optionally with an aggregate substrate) into a revolving drum under conditions sufficient to produce a carbonate aggregate, e.g., made up of a spherical coating on a substrate and/or agglomeration particles. Also provided are aggregate compositions produced by the methods, as well as compositions that includes
(Continued)

the carbonate coated aggregates, e.g., concretes, and uses thereof.

12 Claims, 9 Drawing Sheets

(51) Int. Cl.
*C04B 7/36* (2006.01)
*C04B 22/10* (2006.01)
*C04B 111/00* (2006.01)

(58) Field of Classification Search
CPC .................... C04B 28/02; C04B 7/367; C04B 2111/00019; C04B 14/28; C04B 28/04; C04B 2111/00017; C04B 28/10; C04B 40/0231; C04B 20/0232; C09C 1/02; C09C 1/021; C09C 3/04; C01P 2002/74; C01P 2002/82; C01P 2004/03; B01D 2252/102; B01D 2252/103; B01D 53/1481; B01D 53/1493; Y02P 40/18
See application file for complete search history.

(56) References Cited

U.S. PATENT DOCUMENTS

| | | | |
|---|---|---|---|
| 7,735,274 B2 | 6/2010 | Constantz et al. | |
| 7,749,476 B2 | 7/2010 | Constantz et al. | |
| 7,906,028 B2 | 3/2011 | Constantz et al. | |
| 7,914,685 B2 | 3/2011 | Constantz et al. | |
| 7,931,809 B2 | 4/2011 | Constantz et al. | |
| 8,333,944 B2 | 12/2012 | Constantz et al. | |
| 8,741,244 B2 | 6/2014 | Jones | |
| 8,795,508 B2 | 8/2014 | Jones | |
| 8,857,118 B2 | 10/2014 | Constantz et al. | |
| 9,359,221 B2 | 6/2016 | Jones et al. | |
| 9,957,623 B2 | 5/2018 | Gilliam et al. | |
| 10,668,443 B2 | 6/2020 | Kuppler et al. | |
| 2009/0104349 A1* | 4/2009 | Hills | B09C 1/08 427/242 |
| 2009/0301352 A1 | 12/2009 | Constantz et al. | |
| 2010/0247410 A1 | 9/2010 | Constantz et al. | |
| 2015/0083607 A1 | 3/2015 | Gilliam et al. | |
| 2017/0274318 A1* | 9/2017 | Constantz | B01D 53/18 |

FOREIGN PATENT DOCUMENTS

| | | | |
|---|---|---|---|
| CN | 101952012 | A | 1/2011 |
| CN | 102114383 | A | 7/2011 |
| CN | 201988422 | U | 9/2011 |
| CN | 204024804 | U | 12/2014 |
| CN | 104812466 | A | 7/2015 |
| CN | 105683299 | A | 6/2016 |
| CN | 206404341 | U | 8/2017 |
| CN | 107902686 | A | 4/2018 |
| CN | 108709409 | A | 10/2018 |
| JP | S52-104657 | U | 8/1977 |
| JP | H02-207833 | A | 8/1990 |
| JP | 2008-143765 | A | 6/2008 |
| JP | 2011-521879 | A | 7/2011 |
| KR | 10-2011-0033822 | A | 3/2011 |
| TW | 201012755 | A | 4/2010 |
| WO | WO2007096671 | A1 | 8/2007 |
| WO | WO2008128545 | A1 | 10/2008 |
| WO | WO2016057709 | A2 | 4/2016 |
| WO | WO2017165849 | A1 | 9/2017 |
| WO | WO2017194953 | A1 | 11/2017 |
| WO | WO2018160888 | A1 | 9/2018 |
| WO | WO2021228979 | A1 | 11/2021 |

OTHER PUBLICATIONS

Xue et al. to “The effect of the intimate structure of the solid binder on material viscosity during drum granulation” Powder Technology vol. 253, Feb. 2014, pp. 584-589.*
Kelemen et al., Engineered carbon mineralization in ultramafic rocks for CO2 removal from air: Review and new insights, Chemical Geology, Sep. 2020, vol. 550, No. 119628, p. 1-22.
Maruyama et al., A New Concept of Calcium Carbonate Concrete using Demolished Concrete and CO2, Journal of Advanced Concrete Technology, Oct. 2021, vol. 19, No. 10, p. 1052-1060, abstract only.
The University of Tokyo, A concrete solution: Recycled concrete and CO2 from the air are made into a new building material, Oct. 8, 2021, Retrieved from: https://www.u-tokyo.ac.jp/focus/en/press/z0508_00190.html.
Sevcik et al., Synthetic calcium carbonate improves the effectiveness of treatments with nanolime to contrast decay In highly porous limestone, Scientific Reports, Oct. 2019, vol. 9, Art. 15278, p. 1-13.
Cherkas et al., On the kinetics of phase transformations of dried porous vaterite particles immersed in deionized and tap water, Advanced Powder Technology, Nov. 2018, vol. 29, No. 11, p. 2872-2880.
Fedrizzi et al., Artificial carbonate rocks: Synthesis and petrophysical characterization, Journal of Petroleum Science and Engineering, Apr. 2018, vol. 163, p. 303-310.
Ghouleh et al., Production of carbonate aggregates using steel slag and carbon dioxide for carbon-negative concrete, Journal of CO2 Utilization, Mar. 2017, vol. 18, p. 125-138.
Ihli et al., Dehydration and crystallization of amorphous calcium carbonate in solution and in air, Nature Communications, Jan. 2014, vol. 5, Art. 3169, p. 1-10.
Huang et al., Complex calcium carbonate aggregates: controlled crystallization and assembly via an additive-modified positive-microemulsion-route, CrystEngComm, 2012, vol. 14, No. 4, p. 1277-1282, abstract only.
Gunning et al., Production of lightweight aggregate from industrial waste and carbon dioxide, Waste Management, Oct. 2009, vol. 29, No. 10, p. 2722-2728.
FEECO International, Inc., The Agglomeration Handbook, FEECO.com, 52 pages.
FEECO International, Inc., The Innovation Center, FEECO.com, 8 pages.

* cited by examiner

FIG. 5

| Sample No. | 1 | 2 | 3 | 4 | 5 | 6 | 7 | 8 | |
|---|---|---|---|---|---|---|---|---|---|
| Coating | 0% | 23% | 32% | 34% | 36% | 45% | 54% | 60% | wt% CaCO3 coating |
| Gradation After Coating | n/a (Substrate) | 1/2" x No.50 | 1/2" x No.100 | 3/4" x No.16 | No.4 x No.100 | 3/8" x No. 30 | 1/2" x No.8 | 3/4" x No.16 | |
| 1" | 100% | 100% | 100% | 100% | 100% | 100% | 100% | 100% | % Passing |
| 3/4" | 100% | 100% | 100% | 99% | 100% | 100% | 100% | 99% | % Passing |
| 1/2" | 100% | 98% | 98% | 99% | 100% | 100% | 92% | 99% | % Passing |
| 3/8" | 100% | 94% | 96% | 93% | 100% | 98% | 68% | 93% | % Passing |
| No. 4 | 82% | 50% | 73% | 37% | 73% | 29% | 3% | 37% | % Passing |
| No. 8 | 65% | 18% | 55% | 1% | 13% | 3% | 0% | 1% | % Passing |
| No. 16 | 45% | 3% | 30% | 0% | 6% | 1% | 0% | 0% | % Passing |
| No. 30 | 22% | 1% | 14% | 0% | 3% | 0% | 0% | 0% | % Passing |
| No. 50 | 6% | 0% | 4% | 0% | 1% | 0% | 0% | 0% | % Passing |
| No. 100 | 0% | 0% | 0% | 0% | 0% | 0% | 0% | 0% | % Passing |
| Pan | 0% | 0% | 0% | 0% | 0% | 0% | 0% | 0% | % Passing |
| Gradation Tested | No.4 x No.100 | 1/2" x No.50 | No.8 x No.100 | 3/4" x No.8 | No.8 x No.100 | 3/8" x No. 8 | 1/2" x No.8 | 3/4" x No.8 | |
| Absorption | 6.3% | 13% | 8.7% | 16% | 14% | 17% | 15% | 15% | % Absorption |
| Bulk SSD | 2.38 | 2.3 | 2.27 | 2.53 | 2.17 | 2.56 | 2.51 | 2.33 | |

CARBONATE AGGREGATE COMPOSITIONS AND METHODS OF MAKING AND USING THE SAME

CROSS-REFERENCE TO RELATED APPLICATIONS

Pursuant to 35 U.S.C. § 119(e), this application claims priority to the filing date of U.S. Provisional Application Ser. No. 62/795,986 filed on Jan. 23, 2019; the disclosure of which applications is herein incorporated by reference.

INTRODUCTION

Concrete is the most widely used engineering material in the world, due to its ease of placement and high load bearing capacity. It is estimated that the present world consumption of concrete is over 11 billion metric tons per year. (Concrete, Microstructure, Properties and Materials (2006, McGraw-Hill)).

The main ingredients of concrete are cement, such as Portland cement, with the addition of coarse and fine aggregates, air and water. Aggregates in conventional concretes include sand, natural gravel and crushed stone. Artificial aggregates may also be used, especially in lightweight concretes. Once the component materials are mixed together, the mixture sets or hardens due to the chemical process of hydration in which the water reacts with the cement which bonds the aggregates together to form a stone-like material. The proportions of the component materials affect the physical properties of the resultant concrete and, as such, the proportions of mixture components are selected to meet the requirements of a particular application.

Portland cement is made primarily from limestone, certain clay minerals, and gypsum, in a high temperature process that drives off carbon dioxide and chemically combines the primary ingredients into new compounds. The energy required to fire the mixture consumes about 4 GJ per ton of cement produced.

Because carbon dioxide is generated by both the cement production process itself, as well as by energy plants that generate power to run the production process, cement production is a leading source of current carbon dioxide atmospheric emissions. It is estimated that cement plants account for 5% of global emissions of carbon dioxide. As global warming and ocean acidification become an increasing problem and the desire to reduce carbon dioxide gas emissions (a principal cause of global warming) continues, the cement production industry will fall under increased scrutiny.

Fossil fuels that are employed in cement plants include coal, natural gas, oil, used tires, municipal waste, petroleum coke and biofuels. Fuels are also derived from tar sands, oil shale, coal liquids, and coal gasification and biofuels that are made via syngas. Cement plants are a major source of $CO_2$ emissions, from both the burning of fossil fuels and the $CO_2$ released from the calcination which changes the limestone, shale and other ingredients to Portland cement. Cement plants also produce waste heat. Additionally, cement plants produce other pollutants like NOx, SOx, VOCs, particulates and mercury. Cement plants also produce cement kiln dust (CKD), which must sometimes be land filled, often in hazardous materials landfill sites.

$CO_2$ emissions have been identified as a major contributor to the phenomenon of global warming and ocean acidification. $CO_2$ is a by-product of combustion and it creates operational, economic, and environmental problems. It is expected that elevated atmospheric concentrations of $CO_2$ and other greenhouse gases will facilitate greater storage of heat within the atmosphere leading to enhanced surface temperatures and rapid climate change. $CO_2$ has also been interacting with the oceans driving down the pH toward 8.0. $CO_2$ monitoring has shown atmospheric $CO_2$ has risen from approximately 280 parts per million (ppm) in the 1950s to approximately 400 ppm today. The impact of climate change will likely be economically expensive and environmentally hazardous. Reducing potential risks of climate change will require sequestration of $CO_2$

SUMMARY

Methods of making carbonate aggregates are provided. Aspects of the methods include: preparing a carbonate slurry, subjecting the carbonate slurry to rotational action, e.g., by introducing the carbonate slurry (optionally with an aggregate substrate) into a revolving drum under conditions sufficient to produce a carbonate aggregate, e.g., made up of a spherical coating on a substrate and/or agglomeration particles. Also provided are aggregate compositions produced by the methods, as well as compositions that includes the carbonate coated aggregates, e.g., concretes, and uses thereof.

BRIEF DESCRIPTION OF THE FIGURES

FIG. 5 shows a table of data for aggregate compositions produced by an embodiment of the method, where the method comprises mixing a carbonate slurry and a fine aggregate substrate to produce a carbonate coated aggregate.

DETAILED DESCRIPTION

Figure 1:
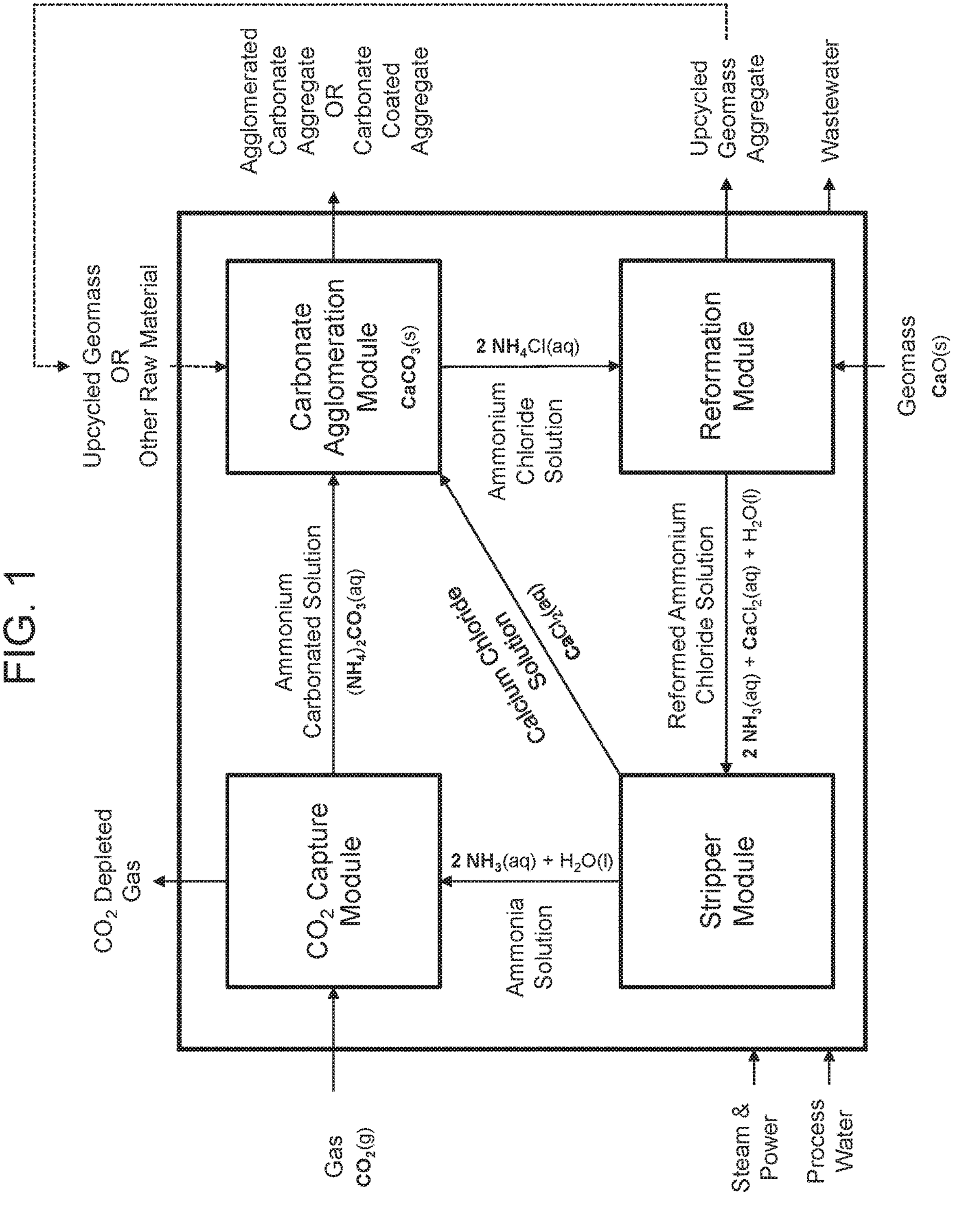
FIG. 1 provides a schematic representation of a method according to an embodiment of the invention, where the method combines a cation source and aqueous carbonate to produce a $CO_2$ sequestering carbonate precipitate.

Methods of making carbonate aggregates are provided. Aspects of the methods include: preparing a carbonate slurry, subjecting the carbonate slurry to rotational action, e.g., by introducing the carbonate slurry (optionally with an aggregate substrate) into a revolving drum under conditions sufficient to produce a carbonate aggregate, e.g., made up of a spherical coating on a substrate and/or agglomeration particles. Also provided are aggregate compositions produced by the methods, as well as compositions that includes the carbonate coated aggregates, e.g., concretes, and uses thereof.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods of Making Carbonate Aggregate Compositions

As summarized above, aspects of the invention include methods of producing carbonate aggregates, such as carbonate coated aggregates. The term "aggregate" is used in its conventional sense to refer to a granular material, i.e., a material made up of grains or particles. As the aggregate is a carbonate aggregate, the particles of the granular material include one or more carbonate compounds, where the carbonate compound(s) component may be combined with other substances (e.g., substrates) or make up the entire particles, as desired. The carbonate aggregates produced by the methods of invention are described in greater detail below.

Aspects of the methods include: preparing a carbonate slurry, introducing the carbonate slurry (optionally with an aggregate substrate) into a revolving drum and mixing the carbonate slurry in the revolving drum under conditions sufficient to produce a carbonate aggregate. Each of these steps is now described further in greater detail. In some embodiments, the coated aggregates will agglomerate, forming composite aggregate grains of more than one substrate particle, agglomerated together.

Carbonate Slurry Production

As summarized above, aspects of the methods include producing a carbonate slurry. The carbonate slurry produced in methods of the invention is a slurry that includes metal carbonate particles, such alkali earth metal carbonate particles, e.g., calcium carbonate particles, magnesium carbonate particles, etc., such as described in greater detail below. While percent solids of the carbonate slurries may vary, in some instances the carbonate slurry includes 30 to 80% solids, such as 40 to 60% solids. While the viscosity of the carbonate slurries may vary, in some instances the carbonate slurries have a viscosity ranging from 2 to 300,000, such as 9 to 900 and including 300 to 30,000 centipoise (cP or cps). While the size of the carbonate particles present in the slurry may vary, in some instances the particles range in size from 0.1 um to 50 um, such as 0.5 to 5 and including 5 to 50 um.

Carbonate slurries, such as described above, may be produced using any convenient protocol. In some instances, the carbonate slurries are produced using a $CO_2$ sequestering process. By $CO_2$ sequestering process is meant a process that converts an amount of gaseous $CO_2$ into a solid carbonate, there sequestering $CO_2$ as a solid mineral. A variety of difference $CO_2$ sequestering processes may be employed to produce a carbonate slurry.

In some instances, an ammonia mediated $CO_2$ sequestering process is employed to produce the carbonate slurry. Embodiments of such methods include multistep or single step protocols, as desired. For example, in some embodiments, combination of a $CO_2$ capture liquid and gaseous source of $CO_2$ results in production of an aqueous carbonate, which aqueous carbonate is then subsequently contacted with a divalent cation source, e.g., a $Ca^{2+}$ and/or $Mg^{2+}$ source, to produce the carbonate slurry. In yet other embodiments, a one-step $CO_2$ gas absorption carbonate precipitation protocol is employed.

The $CO_2$ containing gas may be pure $CO_2$ or be combined with one or more other gasses and/or particulate components, depending upon the source, e.g., it may be a multi-component gas (i.e., a multi-component gaseous stream). In certain embodiments, the $CO_2$ containing gas is obtained from an industrial plant, e.g., where the $CO_2$ containing gas is a waste feed from an industrial plant. Industrial plants from which the $CO_2$ containing gas may be obtained, e.g., as a waste feed from the industrial plant, may vary. Industrial plants of interest include, but are not limited to, power plants and industrial product manufacturing plants, such as, but not limited to, chemical and mechanical processing plants, refineries, cement plants, steel plants, etc., as well as other industrial plants that produce $CO_2$ as a byproduct of fuel combustion or other processing step (such as calcination by a cement plant). Waste feeds of interest include gaseous streams that are produced by an industrial plant, for example as a secondary or incidental product, of a process carried out by the industrial plant.

Of interest in certain embodiments are waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants. Of interest in certain embodiments are waste streams produced by power plants that combust syngas, i.e., gas that is produced by the gasification of organic matter, e.g., coal, biomass, etc., where in certain embodiments such plants are integrated gasification combined cycle (IGCC) plants. Of interest in certain embodiments are waste streams produced by Heat Recovery Steam Generator (HRSG) plants. Waste streams of interest also include waste streams produced by cement plants. Cement plants whose waste streams may be employed in methods of the invention include both wet process and dry process plants, which plants may employ shaft kilns or rotary kilns, and may include pre-calciners. Each of these types of industrial plants may burn a single fuel, or may burn two or more fuels sequentially or simultaneously. A waste stream of interest is industrial plant exhaust gas, e.g., a flue gas. By "flue gas" is meant a gas that is obtained from the products of combustion from burning a fossil or biomass fuel that are then directed to the smokestack, also known as the flue of an industrial plant.

These industrial plants may each burn a single fuel or may burn two or more fuels sequentially or simultaneously. Other industrial plants such as smelters and refineries are also useful sources of waste streams that include carbon dioxide.

Industrial waste gas streams may contain carbon dioxide as the primary non-air derived component, or may, especially in the case of coal-fired power plants, contain additional components (which may be collectively referred to as non-$CO_2$ pollutants) such as nitrogen oxides (NOx), sulfur oxides (SOx), and one or more additional gases. Additional gases and other components may include CO, mercury and other heavy metals, and dust particles (e.g., from calcining and combustion processes). Additional non-$CO_2$ pollutant components in the gas stream may also include halides such as hydrogen chloride and hydrogen fluoride; particulate matter such as fly ash, dusts, and metals including arsenic, beryllium, boron, cadmium, chromium, chromium VI, cobalt, lead, manganese, mercury, molybdenum, selenium, strontium, thallium, and vanadium; and organics such as hydrocarbons, dioxins, and PAH compounds. Suitable gaseous waste streams that may be treated have, in some embodiments, $CO_2$ present in amounts of 200 ppm to 1,000,000 ppm; or 200 ppm to 500,000 ppm; or 200 ppm to 100,000 ppm; or 200 ppm to 10,000; or 200 ppm to 5,000 ppm; or 200 ppm to 2000 ppm; or 200 ppm to 1000 ppm; or 200 to 500 ppm; or 500 ppm to 1,000,000 ppm; or 500 ppm to 500,000 ppm; or 500 ppm to 100,000 ppm; or 500 ppm to 10,000; or 500 ppm to 5,000 ppm; or 500 ppm to 2000 ppm; or 500 ppm to 1000 ppm; or 1000 ppm to 1,000,000 ppm; or 1000 ppm to 500,000 ppm; or 1000 ppm to 100,000 ppm; or 1000 ppm to 10,000; or 1000 ppm to 5,000 ppm; or 1000 ppm to 2000 ppm; or 2000 ppm to 1,000,000 ppm; or 2000 ppm to 500,000 ppm; or 2000 ppm to 100,000 ppm; or 2000 ppm to 10,000; or 2000 ppm to 5,000 ppm; or 2000 ppm to 3000 ppm; or 5000 ppm to 1,000,000 ppm; or 5000 ppm to 500,000 ppm; or 5000 ppm to 100,000 ppm; or 5000 ppm to 10,000; or 10,000 ppm to 1,000,000 ppm; or 10.00 ppm to 500,000 ppm; or 10,000 ppm to 100,000 ppm; or 50,000 ppm to 1,000,000 ppm; or 50,000 ppm to 500,000 ppm; or 50,000 ppm to 100,000 ppm; or 100,000 ppm to 1,000,000 ppm; or 100,000 ppm to 500,000 ppm; or 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm.

The waste streams, particularly various waste streams of combustion gas, may include one or more additional non-$CO_2$ components, for example only, water, NOx (mononitrogen oxides: NO and $NO_2$), SOx (monosulfur oxides: SO, $SO_2$ and $SO_3$), VOC (volatile organic compounds), heavy metals such as, but not limited to, mercury, and particulate matter (particles of solid or liquid suspended in a gas). Flue gas temperature may also vary. In some embodiments, the temperature of the flue gas comprising $CO_2$ is from 0° C. to 2000° C., or 0° C. to 1000° C., or 0° C. to 500° C., or 0° C. to 100° C., or 0° C. to 50° C., or 10° C. to 2000° C., or 10° C. to 1000° C., or 10° C. to 500° C., or 10° C. to 100° C., or 10° C. to 50° C., or 50° C. to 2000° C., or 50° C. to 1000° C., or 50° C. to 500° C., or 50° C. to 100° C., or 100° C. to 2000° C., or 100° C. to 1000° C., or 100° C. to 500° C., or 500° C. to 2000° C., or 500° C. to 1000° C., or 500° C. to 800° C., or such as from 60° C. to 700° C., and including 100° C. to 400° C.

Another gaseous source of $CO_2$ is a direct air capture (DAC) generated gaseous source of $CO_2$. The DAC generated gaseous source of $CO_2$ is a product gas produced by a direct air capture (DAC) system. DAC systems are a class of technologies capable of separating carbon dioxide $CO_2$ directly from ambient air. A DAC system is any system that captures $CO_2$ directly from air and generates a product gas that includes $CO_2$ at a higher concentration than that of the air that is input into the DAC system. While the concentration of $CO_2$ in the DAC generated gaseous source of $CO_2$ may vary, in some instances the concentration 1,000 ppm or greater, such as 10,000 ppm or greater, including 100,000 ppm or greater, where the product gas may not be pure $CO_2$, such that in some instances the product gas is 3% or more non-$CO_2$ constituents, such as 5% or more non-$CO_2$ constituents, including 10% or more non-$CO_2$ constituents. Non-$CO_2$ constituents that may be present in the product stream may be constituents that originate in the input air and/or from the DAC system. In some instances, the concentration of $CO_2$ in the DAC product gas ranges from 1,000 to 999,000 ppm, such as 1,000 to 10,000 ppm, or 10,000 to 100,000 ppm or 100,000 to 999,000 ppm. DAC generated gaseous streams have, in some embodiments, $CO_2$ present in amounts of 200 ppm to 1,000,000 ppm; or 200 ppm to 500,000 ppm; or 200 ppm to 100,000 ppm; or 200 ppm to 10,000; or 200 ppm to 5,000 ppm; or 200 ppm to 2000 ppm; or 200 ppm to 1000 ppm; or 200 to 500 ppm; or 500 ppm to 1,000,000 ppm; or 500 ppm to 500,000 ppm; or 500 ppm to 100,000 ppm; or 500 ppm to 10,000; or 500 ppm to 5,000 ppm; or 500 ppm to 2000 ppm; or 500 ppm to 1000 ppm; or 1000 ppm to 1,000,000 ppm; or 1000 ppm to 500,000 ppm; or 1000 ppm to 100,000 ppm; or 1000 ppm to 10,000; or 1000 ppm to 5,000 ppm; or 1000 ppm to 2000 ppm; or 2000 ppm to 1,000,000 ppm; or 2000 ppm to 500,000 ppm; or 2000 ppm to 100,000 ppm; or 2000 ppm to 10,000; or 2000 ppm to 5,000 ppm; or 2000 ppm to 3000 ppm; or 5000 ppm to 1,000,000 ppm; or 5000 ppm to 500,000 ppm; or 5000 ppm to 100,000 ppm; or 5000 ppm to 10,000; or 10,000 ppm to 1,000,000 ppm; or 10.00 ppm to 500,000 ppm; or 10,000 ppm to 100,000 ppm; or 50,000 ppm to 1,000,000 ppm; or 50,000 ppm to 500,000 ppm; or 50,000 ppm to 100,000 ppm; or 100,000 ppm to 1,000,000 ppm; or 100,000 ppm to 500,000 ppm; or 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm.

The DAC product gas that is contacted with the aqueous capture liquid may be produced by any convenient DAC system. DAC systems are systems that extract $CO_2$ from the air using media that binds to $CO_2$ but not to other atmospheric chemicals (such as nitrogen and oxygen). As air passes over the $CO_2$ binding medium, $CO_2$ "sticks" to the binding medium. In response to a stimulus, e.g., heat, humidity, etc., the bound $CO_2$ may then be released from the binding medium resulting the production of a gaseous $CO_2$ containing product. DAC systems of interest include, but are not limited to: hydroxide based systems; $CO_2$ sorbent/temperature swing based systems, and $CO_2$ sorbent/temperature swing based systems. In some instances, the DAC system is a hydroxide based system, in which $CO_2$ is separated from air by contacting the air with is an aqueous hydroxide liquid. Examples of hydroxide based DAC systems include, but are not limited to, those described in PCT published application Nos. WO/2009/155539; WO/2010/022339; WO/2013/036859; and WO/2013/120024; the disclosures of which are herein incorporated by reference. In some instances, the DAC system is a $CO_2$ sorbent based system, in which $CO_2$ is separated from air by contacting the air with sorbent, such as an amine sorbent, followed by release of the sorbent captured $CO_2$ by subjecting the sorbent to one or more stimuli, e.g., change in temperature, change in humidity, etc. Examples of such DAC systems include, but are not limited to, those described in PCT published application Nos. WO/2005/108297; WO/2006/009600; WO/2006/023743; WO/2006/036396; WO/2006/084008; WO/2007/016271; WO/2007/114991; WO/2008/042919; WO/2008/061210; WO/2008/131132; WO/2008/144708; WO/2009/061836; WO/2009/067625; WO/2009/105566; WO/2009/149292; WO/2010/019600; WO/2010/022399; WO/2010/107942; WO/2011/011740; WO/2011/137398; WO/2012/106703; WO/2013/028688; WO/2013/075981; WO/2013/166432; WO/2014/170184; WO/2015/103401; WO/2015/185434; WO/2016/005226; WO/2016/037668; WO/2016/162022; WO/2016/164563; WO/2016/161998; WO/2017/184652; and WO/2017/009241; the disclosures of which are herein incorporated by reference.

Further details regarding DAC generated gaseous sources of $CO_2$ and their use in producing carbonate slurries may be found in PCT application serial no. PCT/US2018/020527 published as WO 2018/160888, the disclosure of which is herein incorporated by reference.

As summarized above, an aqueous capture liquid is contacted with the gaseous source of $CO_2$ under conditions sufficient to produce an aqueous carbonate. The aqueous capture liquid may vary. Examples of aqueous capture liquids include, but are not limited to fresh water to bicarbonate buffered aqueous media. Bicarbonate buffered aqueous media employed in embodiments of the invention include liquid media in which a bicarbonate buffer is present. The bicarbonate buffered aqueous medium may be a naturally occurring or man-made medium, as desired. Naturally occurring bicarbonate buffered aqueous media include, but are not limited to, waters obtained from seas, oceans, lakes, swamps, estuaries, lagoons, brines, alkaline lakes, inland seas, etc. Man-made sources of bicarbonate buffered aqueous media may also vary, and may include brines produced by water desalination plants, and the like. Further details regarding such capture liquids are provided in PCT published application Nos. WO2014/039578; WO 2015/134408; and WO 2016/057709; the disclosures of which applications are herein incorporated by reference.

In some embodiments, an aqueous capture ammonia is contacted with the gaseous source of $CO_2$ under conditions sufficient to produce an aqueous ammonium carbonate. The concentration of ammonia in the aqueous capture ammonia may vary, where in some instances the aqueous capture ammonia includes ammonia ($NH_3$) at a concentration ranging from 10 ppm to 350,000 ppm $NH_3$, such as 10 to 10,000 ppm, or 10 to 1,000 ppm, or 10 to 5,000 ppm, or 10 to 8,000 ppm, or 10 to 10,000 ppm, or 100 to 100,000 ppm, or 100 to 10,000 ppm, or 100 to 50,000 ppm, or 100 to 80,000 ppm, or 100 to 100,000 ppm, or 1,000 to 350,000 ppm, or 1,000 to 50,000 ppm, or 1,000 to 80,000 ppm, or 1,000 to 100,000 ppm, or 1,000 to 200,000 ppm, or 1,000 to 350,000 ppm, or such as from 6,000 to 85,000 ppm, and including 8,000 to 50,000 ppm. The aqueous capture ammonia may include any convenient water. Waters of interest from which the aqueous capture ammonia may be produced include, but are not limited to, freshwaters, seawaters, brine waters, reclaimed or recycled waters, produced waters and waste waters. The pH of the aqueous capture ammonia may vary, ranging in some instances from 9.0 to 13.5, such as 9.0 to 13.0, including 10.5 to 12.5. Further details regarding aqueous capture ammonias of interest are provided in PCT published application No. WO 2017/165849; the disclosure of which is herein incorporated by reference.

The $CO_2$ containing gas, e.g., as described above, may be contacted with the aqueous capture liquid, e.g., aqueous capture ammonia, using any convenient protocol. For example, contact protocols of interest include, but are not limited to: direct contacting protocols, e.g., bubbling the gas through a volume of the aqueous medium, concurrent contacting protocols, i.e., contact between unidirectionally flowing gaseous and liquid phase streams, countercurrent protocols, i.e., contact between oppositely flowing gaseous and liquid phase streams, and the like. Contact may be accomplished through use of infusers, bubblers, fluidic Venturi reactors, spargers, gas filters, sprays, trays, scrubbers, absorbers or packed column reactors, and the like, as may be convenient. In some instances, the contacting protocol may use a conventional absorber or an absorber froth column, such as those described in U.S. Pat. Nos. 7,854,791; 6,872,240; and 6,616,733; and in United States Patent Application Publication US-2012-0237420-A1; the disclosures of which are herein incorporated by reference. The process may be a batch or continuous process. In some instances, a regenerative froth contactor (RFC) may be employed to contact the $CO_2$ containing gas with the aqueous capture liquid, e.g., aqueous capture ammonia. In some such instances, the RFC may use a catalyst (such as described elsewhere), e.g., a catalyst that is immobilized on/to the internals of the RFC. Further details regarding a suitable RFC are found in U.S. Pat. No. 9,545,598, the disclosure of which is herein incorporated by reference.

In some instances, the gaseous source of $CO_2$ is contacted with the liquid using a microporous membrane contactor. Microporous membrane contactors of interest include a microporous membrane present in a suitable housing, where the housing includes a gas inlet and a liquid inlet, as well a gas outlet and a liquid outlet. The contactor is configured so that the gas and liquid contact opposite sides of the membrane in a manner such that molecule may dissolve into the liquid from the gas via the pores of the microporous membrane. The membrane may be configured in any convenient format, where in some instances the membrane is configured in a hollow fiber format. Hollow fiber membrane reactor formats which may be employed include, but are not limited to, those described in U.S. Pat. Nos. 7,264,725; 6,872,240 and 5,695,545; the disclosures of which are herein incorporated by reference. In some instances, the microporous hollow fiber membrane contactor that is employed is a hollow fiber membrane contactor, which membrane contactors include polypropylene membrane contactors and polyolefin membrane contactors.

Contact between the capture liquid and the $CO_2$-containing gas occurs under conditions such that a substantial portion of the $CO_2$ present in the $CO_2$-containing gas goes into solution, e.g., to produce bicarbonate ions. By substantial portion is meant 10% or more, such as 50% or more, including 80% or more.

The temperature of the capture liquid that is contacted with the $CO_2$-containing gas may vary. In some instances, the temperature ranges from −1.4 to 100° C., such as 20 to 80° C. and including 40 to 70° C. In some instances, the temperature may range from −1.4 to 50° C. or higher, such as from −1.1 to 45° C. or higher. In some instances, cooler temperatures are employed, where such temperatures may range from −1.4 to 4° C., such as −1.1 to 0° C. In some instances, warmer temperatures are employed. For example, the temperature of the capture liquid in some instances may be 25° C. or higher, such as 30° C. or higher, and may in some embodiments range from 25 to 50° C., such as 30 to 40° C.

The $CO_2$-containing gas and the capture liquid are contacted at a pressure suitable for production of a desired $CO_2$ charged liquid. In some instances, the pressure of the contact conditions is selected to provide for optimal $CO_2$ absorption, where such pressures may range from 1 ATM to 100 ATM, such as 1 to 50 ATM, e.g., 20-30 ATM or 1 ATM to 10 ATM. Where contact occurs at a location that is naturally at 1 ATM, the pressure may be increased to the desired pressure using any convenient protocol. In some instances, contact occurs where the optimal pressure is present, e.g., at a location under the surface of a body of water, such as an ocean or sea.

In those embodiments where the gaseous source of $CO_2$ is contacted with an aqueous capture ammonia, contact is carried out in manner sufficient to produce an aqueous ammonium carbonate. The aqueous ammonium carbonate may vary, where in some instances the aqueous ammonium carbonate comprises at least one of ammonium carbonate and ammonium bicarbonate and in some instances comprises both ammonium carbonate and ammonium bicarbonate. The aqueous ammonium bicarbonate may be viewed as a DIC containing liquid. As such, in charging the aqueous capture ammonia with $CO_2$, a $CO_2$ containing gas may be contacted with $CO_2$ capture liquid under conditions sufficient to produce dissolved inorganic carbon (DIC) in the $CO_2$ capture liquid, i.e., to produce a DIC containing liquid. The DIC is the sum of the concentrations of inorganic carbon species in a solution, represented by the equation: $DIC=[CO_2^*]+[HCO_3^-]+[CO_3^{2-}]$, where $[CO_2^*]$ is the sum of carbon dioxide ($[CO_2]$) and carbonic acid ($[H_2CO_3]$) concentrations, $[HCO_3^-]$ is the bicarbonate concentration (which includes ammonium bicarbonate) and $[CO_3^{2-}]$ is the carbonate concentration (which includes ammonium carbonate) in the solution. The DIC of the aqueous media may vary, and in some instances may be 3 ppm to 168,000 ppm carbon (C), such as 3 to 1,000 ppm, or 3 to 100 ppm, or 3 to 500 ppm, or 3 to 800 ppm, or 3 to 1,000 ppm, or 100 to 10,000 ppm, or 100 to 1,000 ppm, or 100 to 5,000 ppm, or 100 to 8,000 ppm, or 100 to 10,000 ppm, or 1,000 to 50,000 ppm, or 1,000 to 8,000 ppm, or 1,000 to 15,000 ppm, or 1,000 to 30,000 ppm, or 5,000 to 168,000 ppm, or 5,000 to 25,000 ppm, or such as from 6,000 to 65,000 ppm, and including 8,000 to 95,000 ppm carbon (C). The amount of $CO_2$ dissolved in the liquid may vary, and in some instances ranges from 0.05 to 40 mM, such as 1 to 35 mM, including 25 to 30 mM. The pH of the resultant DIC containing liquid may vary, ranging in some instances from 4 to 12, such as 6 to 11 and including 7 to 11, e.g., 8 to 9.5.

Where desired, the $CO_2$ containing gas is contacted with the capture liquid in the presence of a catalyst (i.e., an absorption catalyst, either hetero- or homogeneous in nature) that mediates the conversion of $CO_2$ to bicarbonate. Of interest as absorption catalysts are catalysts that, at pH levels ranging from 8 to 10, increase the rate of production of bicarbonate ions from dissolved $CO_2$. The magnitude of the rate increase (e.g., as compared to control in which the catalyst is not present) may vary, and in some instances is 2-fold or greater, such as 5-fold or greater, e.g., 10-fold or greater, as compared to a suitable control. Further details regarding examples of suitable catalysts for such embodiments are found in U.S. Pat. No. 9,707,513, the disclosure of which is herein incorporated by reference.

In some embodiments, the resultant aqueous ammonium carbonate is a two-phase liquid which includes droplets of a liquid condensed phase (LCP) in a bulk liquid, e.g., bulk solution. By "liquid condensed phase" or "LCP" is meant a phase of a liquid solution which includes bicarbonate ions wherein the concentration of bicarbonate ions is higher in the LCP phase than in the surrounding, bulk liquid. LCP droplets are characterized by the presence of a meta-stable bicarbonate-rich liquid precursor phase in which bicarbonate ions associate into condensed concentrations exceeding that of the bulk solution and are present in a non-crystalline solution state. The LCP contains all of the components found in the bulk solution that is outside of the interface. However, the concentration of the bicarbonate ions is higher than in the bulk solution. In those situations where LCP droplets are present, the LCP and bulk solution may each contain ion-pairs and pre-nucleation clusters (PNCs). When present, the ions remain in their respective phases for long periods of time, as compared to ion-pairs and PNCs in solution. Further details regarding LCP containing liquids are provided in U.S. patent application Ser. No. 14/636,043, the disclosure of which is herein incorporated by reference.

As summarized above, both multistep and single step protocols may be employed to produce the $CO_2$ sequestering carbonate slurry from the $CO_2$ containing gas the aqueous capture ammonia. For example, in some embodiments the product aqueous ammonium carbonate is forwarded to a $CO_2$ sequestering carbonate slurry production module, where divalent cations, e.g., $Ca^{2+}$ and/or $Mg^{2+}$, are combined with the aqueous ammonium carbonate to produce the $CO_2$ sequestering carbonate slurry. In yet other instances, aqueous capture ammonia includes a source of divalent cations, e.g., $Ca^{2+}$ and/or $Mg^{2+}$, such that aqueous ammonium carbonate combines with the divalent cations as it is produced to result in production of a $CO_2$ sequestering carbonate slurry.

Accordingly, in some embodiments, following production of an aqueous carbonate, such as an aqueous ammonium carbonate, e.g., as described above, the aqueous carbonate is subsequently combined with a cation source under conditions sufficient to produce a solid $CO_2$ sequestering carbonate. Cations of different valances can form solid carbonate compositions (e.g., in the form of carbonate minerals). In some instances, monovalent cations, such as sodium and potassium cations, may be employed. In other instances, divalent cations, such as alkaline earth metal cations, e.g., calcium ($Ca^{2+}$) and magnesium ($Mg^{2+}$) cations, may be employed. When cations are added to the aqueous carbonate, precipitation of carbonate solids, such as amorphous calcium carbonate ($CaCO_3$) when the divalent cations include $Ca^{2+}$, may be produced with a stoichiometric ratio of one carbonate-species ion per cation.

Any convenient cation source may be employed in such instances. Cation sources of interest include, but are not limited to, the brine from water processing facilities such as sea water desalination plants, brackish water desalination plants, groundwater recovery facilities, wastewater facilities, blowdown water from facilities with cooling towers, and the like, which produce a concentrated stream of solution high in cation contents. Also of interest as cation sources are naturally occurring sources, such as but not limited to native seawater and geological brines, which may have varying cation concentrations and may also provide a ready source of cations to trigger the production of carbonate solids from the aqueous ammonium carbonate. In some instances, the cation source may be a waste product of another step of the process, e.g., a calcium salt (such as $CaCl_2$)) produced during regeneration of ammonia from the aqueous ammonium salt.

In yet other embodiments, the aqueous capture ammonia includes cations, e.g., as described above. The cations may be provided in the aqueous capture ammonia using any convenient protocol. In some instances, the cations present in the aqueous capture ammonia are derived from a geomass used in regeneration of the aqueous capture ammonia from an aqueous ammonium salt. In addition and/or alternatively, the cations may be provided by combining an aqueous capture ammonia with a cation source, e.g., as described above.

Other $CO_2$ sequestering carbonate slurry production protocols that may be employed include alkaline intensive protocols, in which a $CO_2$ containing gas is contacted with an aqueous medium at pH of about 10 or more. Examples of such protocols include, but are not limited to, those described in U.S. Pat. Nos. 8,333,944; 8,177,909; 8,137,455; 8,114,214; 8,062,418; 8,006,446; 7,939,336; 7,931,809; 7,922,809; 7,914,685; 7,906,028; 7,887,694; 7,829,053; 7,815,880; 7,771,684; 7,753,618; 7,749,476; 7,744,761; and 7,735,274; the disclosures of which are herein incorporated by reference.

Following production of an aqueous carbonate, such as an aqueous ammonium carbonate, e.g., as described above, the aqueous carbonate is combined with a cation source under conditions sufficient to produce a solid $CO_2$ sequestering carbonate. Cations of different valances can form solid carbonate compositions (e.g., in the form of carbonate minerals). In some instances, monovalent cations, such as sodium and potassium cations, may be employed. In other instances, divalent cations, such as alkaline earth metal cations, e.g., calcium and magnesium cations, may be employed. Transition metals may also be employed, e.g., Fe, Mn, Cu, etc. When cations are added to the aqueous carbonate, precipitation of carbonate solids, such as amorphous calcium carbonate when the divalent cations include $Ca^{2+}$, may be produced with a stoichiometric ratio of one carbonate-species ion per cation.

Any convenient cation source may be employed in such instances. Cation sources of interest include, but are not limited to, the brine from water processing facilities such as sea water desalination plants, brackish water desalination plants, groundwater recovery facilities, wastewater facilities, and the like, which produce a concentrated stream of solution high in cation contents. Also of interest as cation sources are naturally occurring sources, such as but not limited to native seawater and geological brines, which may have varying cation concentrations and may also provide a ready source of cations to trigger the production of carbonate solids from the aqueous ammonium carbonate. In some instances, the cation source may be a waste product of another step of the process, e.g., a calcium salt (such as $CaCl_2$)) produced during regeneration of ammonia from the aqueous ammonium salt.

As summarized above, production of $CO_2$ sequestering carbonate from the aqueous ammonia capture liquid and the gaseous source of $CO_2$ yields an aqueous ammonium salt. The produced aqueous ammonium salt may vary with respect to the nature of the anion of the ammonium salt, where specific ammonium salts that may be present in the aqueous ammonium salt include, but are not limited to, ammonium chloride, ammonium acetate, ammonium sulfate, ammonium nitrate, etc.

As reviewed above, aspects of the invention further include regenerating an aqueous capture ammonia, e.g., as described above, from the aqueous ammonium salt. By regenerating an aqueous capture ammonium is meant processing the aqueous ammonium salt in a manner sufficient to generate an amount of ammonium from the aqueous ammonium salt. The percentage of input ammonium salt that is converted to ammonia during this regeneration step may vary, ranging in some instances from 5 to 80%, such as 15 to 55%, and in some instances 20 to 80%, e.g., 35 to 55%.

Ammonia may be regenerated from an aqueous ammonium salt in this regeneration step using any convenient regeneration protocol. In some instances, a distillation protocol is employed. While any convenient distillation protocol may be employed, in some embodiments the employed distillation protocol includes heating the aqueous ammonium salt in the presence of an alkalinity source, e.g., geomass, to produce a gaseous ammonia/water product, which may then be condensed to produce a liquid aqueous capture ammonia. In some instances, the protocol happens continuously in a stepwise process wherein heating the aqueous ammonium salt in the present of an alkalinity source happens before the distillation and condensation of liquid aqueous capture ammonia.

The alkalinity source may vary, so long as it is sufficient to convert ammonium in the aqueous ammonium salt to ammonia. Any convenient alkalinity source may be employed.

Alkalinity sources that may be employed in this regeneration step include chemical agents. Chemical agents that may be employed as alkalinity sources include, but are not limited to, hydroxides, organic bases, super bases, oxides, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. Super bases suitable for use as proton-removing agents include sodium ethoxide, sodium amide ($NaNH_2$), sodium hydride (NaH), butyl lithium, lithium diisopropylamide, lithium diethylamide, and lithium bis (trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used.

Also of interest as alkalinity sources are silica sources. The source of silica may be pure silica or a composition that includes silica in combination with other compounds, e.g., minerals, so long as the source of silica is sufficient to impart desired alkalinity. In some instances, the source of silica is a naturally occurring source of silica. Naturally occurring sources of silica include silica containing rocks, which may be in the form of sands or larger rocks. Where the source is larger rocks, in some instances the rocks have been broken down to reduce their size and increase their surface area. Of interest are silica sources made up of components having a longest dimension ranging from 0.01 mm to 1 meter, such as 0.1 mm to 500 cm, including 1 mm to 100 cm, e.g., 1 mm to 50 cm. The silica sources may be surface treated, where desired, to increase the surface area of the sources. A variety of different naturally occurring silica sources may be employed. Naturally occurring silica sources of interest include, but are not limited to, igneous rocks, which rocks include: ultramafic rocks, such as Komatiite, Picrite basalt, Kimberlite, Lamproite, Peridotite; mafic rocks, such as Basalt, Diabase (Dolerite) and Gabbro; intermediate rocks, such as Andesite and Diorite; intermediate felsic rocks, such as Dacite and Granodiorite; and Felsic rocks, such as Rhyolite, Aplite-Pegmatite and Granite. Also of interest are man-made sources of silica. Man-made sources of silica include, but are not limited to, waste streams such as: mining wastes; fossil fuel burning ash; slag, e.g. iron and steel slags, phosphorous slag; cement kiln waste; oil refinery/petrochemical refinery waste, e.g. oil field and methane seam brines; coal seam wastes, e.g. gas production brines and coal seam brine; paper processing waste; water softening, e.g. ion exchange waste brine; silicon processing wastes; agricultural waste; metal finishing waste; high pH textile waste; and caustic sludge. Mining wastes include any wastes from the extraction of metal or another precious or useful mineral from the earth. Wastes of interest include wastes from mining to be used to raise pH, including: red mud from the Bayer aluminum extraction process; the waste from magnesium extraction for sea water, e.g. at Moss Landing, Calif.; and the wastes from other mining processes involving leaching. Ash from processes burning fossil fuels, such as coal fired power plants, create ash that is often rich in silica. In some embodiments, ashes resulting from burning fossil fuels, e.g. coal fired power plants, are provided as silica sources, including fly ash, e.g., ash that exits out the smoke stack, and bottom ash. Additional details regarding silica sources and their use are described in U.S. Pat. No. 9,714,406; the disclosure of which is herein incorporated by reference.

In embodiments of the invention, ash is employed as an alkalinity source. Of interest in certain embodiments is use of a coal ash as the ash. The coal ash as employed in this invention refers to the residue produced in power plant boilers or coal burning furnaces, for example, chain grate boilers, cyclone boilers and fluidized bed boilers, from burning pulverized anthracite, lignite, bituminous or sub-bituminous coal. Such coal ash includes fly ash which is the finely divided coal ash carried from the furnace by exhaust or flue gases; and bottom ash which collects at the base of the furnace as agglomerates.

Fly ashes are generally highly heterogeneous, and include of a mixture of glassy particles with various identifiable crystalline phases such as quartz, mullite, and various iron oxides. Fly ashes of interest include Type F and Type C fly ash. The Type F and Type C fly ashes referred to above are defined by CSA Standard A23.5 and ASTM C618 as mentioned above. The chief difference between these classes is the amount of calcium, silica, alumina, and iron content in the ash. The chemical properties of the fly ash are largely influenced by the chemical content of the coal burned (i.e., anthracite, bituminous, and lignite). Fly ashes of interest include substantial amounts of silica (silicon dioxide, $SiO_2$) (both amorphous and crystalline) and lime (calcium oxide, CaO, magnesium oxide, MgO).

The burning of harder, older anthracite and bituminous coal typically produces Class F fly ash. Class F fly ash is pozzolanic in nature, and contains less than 10% lime (CaO). Fly ash produced from the burning of younger lignite or subbituminous coal, in addition to having pozzolanic properties, also has some self-cementing properties. In the presence of water, Class C fly ash will harden and gain strength over time. Class C fly ash generally contains more than 20% lime (CaO). Alkali and sulfate ($SO_4^{2-}$) contents are generally higher in Class C fly ashes. In some embodiments it is of interest to use Class C fly ash to regenerate ammonia from an aqueous ammonium salt, e.g., as mentioned above, with the intention of extracting quantities of constituents present in Class C fly ash so as to generate a fly ash closer in characteristics to Class F fly ash, e.g., extracting 95% of the CaO in Class C fly ash that has 20% CaO, thus resulting in a remediated fly ash material that has 1% CaO.

Fly ash material solidifies while suspended in exhaust gases and is collected using various approaches, e.g., by electrostatic precipitators or filter bags. Since the particles solidify while suspended in the exhaust gases, fly ash particles are generally spherical in shape and range in size from 0.5 μm to 100 μm. Fly ashes of interest include those in which at least about 80%, by weight comprises particles of less than 45 microns. Also of interest in certain embodiments of the invention is the use of highly alkaline fluidized bed combustor (FBC) fly ash.

Also of interest in embodiments of the invention is the use of bottom ash. Bottom ash is formed as agglomerates in coal combustion boilers from the combustion of coal. Such combustion boilers may be wet bottom boilers or dry bottom boilers. When produced in a wet or dry bottom boiler, the bottom ash is quenched in water. The quenching results in agglomerates having a size in which 90% fall within the particle size range of 0.1 mm to 20 mm, where the bottom ash agglomerates have a wide distribution of agglomerate size within this range. The main chemical components of a bottom ash are silica and alumina with lesser amounts of oxides of Fe, Ca, Mg, Mn, Na and K, as well as sulphur and carbon.

Also of interest in certain embodiments is the use of volcanic ash as the ash. Volcanic ash is made up of small tephra, i.e., bits of pulverized rock and glass created by volcanic eruptions, less than 2 millimeters in diameter.

In one embodiment of the invention, cement kiln dust (CKD) is employed as an alkalinity source. The nature of the fuel from which the ash and/or CKD were produced, and the means of combustion of said fuel, will influence the chemical composition of the resultant ash and/or CKD. Thus ash and/or CKD may be used as a portion of the means for adjusting pH, or the sole means, and a variety of other components may be utilized with specific ashes and/or CKDs, based on chemical composition of the ash and/or CKD.

In certain embodiments of the invention, slag is employed as an alkalinity source. The slag may be used as a as the sole pH modifier or in conjunction with one or more additional pH modifiers, e.g., ashes, etc. Slag is generated from the processing of metals, and may contain calcium and magnesium oxides as well as iron, silicon and aluminum compounds. In certain embodiments, the use of slag as a pH modifying material provides additional benefits via the introduction of reactive silicon and alumina to the precipitated product. Slags of interest include, but are not limited to, blast furnace slag from iron smelting, slag from electric-arc or blast furnace processing of iron and/or steel, copper slag, nickel slag and phosphorus slag.

As indicated above, ash (or slag in certain embodiments) is employed in certain embodiments as the sole way to modify the pH of the water to the desired level. In yet other embodiments, one or more additional pH modifying protocols is employed in conjunction with the use of ash.

Also of interest in certain embodiments is the use of other waste materials, e.g., crushed or demolished or recycled or returned concretes or mortars, as an alkalinity source. When employed, the concrete dissolves releasing sand and aggregate which, where desired, may be recycled to the carbonate production portion of the process. Use of demolished and/or recycled concretes or mortars is further described below.

Of interest in certain embodiments are mineral alkalinity sources. The mineral alkalinity source that is contacted with the aqueous ammonium salt in such instances may vary, where mineral alkalinity sources of interest include, but are not limited to: silicates, carbonates, fly ashes, slags, limes, cement kiln dusts, etc., e.g., as described above. In some instances, the mineral alkalinity source comprises a rock, e.g., as described above.

In embodiments, the alkalinity source is a geomass, e.g., as described in greater detail below.

While the temperature to which the aqueous ammonium salt is heated in these embodiments may vary, in some instances the temperature ranges from 25 to 200° C., such as 25 to 185° C. The heat employed to provide the desired temperature may be obtained from any convenient source, including steam, a waste heat source, such as flue gas waste heat, etc.

Distillation may be carried out at any pressure. Where distillation is carried out at atmospheric pressure, the temperature at which distillation is carried out may vary, ranging in some instances from 50 to 120° C., such as 60 to 100° C., e.g., from 70 to 90° C. In some instances, distillation is carried out at a sub-atmospheric pressure. While the pressure in such embodiments may vary, in some instances the sub-atmospheric pressure ranges from 1 to 14 psig, such as from 2 to 6 psig. Where distillation is carried out at sub-atmospheric pressure, the distillation may be carried out at a reduced temperature as compared to embodiments that are performed at atmospheric pressure. While the temperature may vary in such instances as desired, in some embodiments where a sub-atmospheric pressure is employed, the temperature ranges from 15 to 60° C., such as 25 to 50° C. Of interest in sub-atmospheric pressure embodiments is the use of a waste heat for some, if not all, of the heat employed during distillation. Waste heat sources of that may be employed in such instances include, but are not limited to: flue gas, process steam condensate, heat of absorption generated by $CO_2$ capture and resultant ammonium carbonate production; and a cooling liquid (such as from a co-located source of $CO_2$ containing gas, such as a power plant, factory etc., e.g., as described above), and combinations thereof Aqueous capture ammonia regeneration may also be achieved using an electrolysis mediated protocol, in which a direct electric current is introduced into the aqueous ammonium salt to regenerate ammonia. Any convenient electrolysis protocol may be employed. Examples of electrolysis protocols that may be adapted for regeneration of ammonia from an aqueous ammonium salt may employed one or more elements from the electrolysis systems described in U.S. Pat. Nos. 7,727,374 and 8,227,127, as well as published PCT Application Publication No. WO/2008/018928; the disclosures of which are hereby incorporated by reference.

In some instances, the aqueous capture ammonia is regenerated from the aqueous ammonium salt without the input of energy, e.g., in the form of heat and/or electric current, such as described above. In such instances, the aqueous ammonium salt is combined with an alkaline source, such as a geomass source, e.g., as described above, in a manner sufficient to produce a regenerated aqueous capture ammonia. The resultant aqueous capture ammonia is then not purified, e.g., by input of energy, such as via stripping protocol, etc.

The resultant regenerated aqueous capture ammonia may vary, e.g., depending on the particular regeneration protocol that is employed. In some instances, the regenerated aqueous capture ammonia includes ammonia ($NH_3$) at a concentration ranging from 0.1 to 25 moles per liter (M), such as from 4 to 20 M, including from 12.0 to 16.0 M, as well as any of the ranges provided for the aqueous capture ammonia provided above. The pH of the aqueous capture ammonia may vary, ranging in some instances from 10.0 to 13.0, such as 10.0 to 12.5. In some instances, e.g., where the aqueous capture ammonia is regenerated in a geomass mediated protocol that does not include input of energy, e.g., as described above, the regenerated aqueous capture ammonia may further include cations, e.g., divalent cations, such as $Ca^{2+}$. In addition, the regenerated aqueous capture ammonia may further include an amount of ammonium salt. In some instances, ammonia ($NH_3$) is present at a concentration ranging from 0.05 to 4 moles per liter (M), such as from 0.05 to 1 M, including from 0.1 to 2 M. The pH of the aqueous capture ammonia may vary, ranging in some instances from 8.0 to 11.0, such as from 8.0 to 10.0. The aqueous capture ammonia may further include ions, e.g., monovalent cations, such as ammonium ($NH_4^+$) at a concentration ranging from 0.1 to 5 moles per liter (M), such as from 0.1 to 2 M, including from 0.5 to 3 M, divalent cations, such as calcium ($Ca^{2+}$) at a concentration ranging from 0.05 to 2 moles per liter (M), such as from 0.1 to 1 M, including from 0.2 to 1 M, divalent cations, such as magnesium ($Mg^{2+}$) at a concentration ranging from 0.005 to 1 moles per liter (M), such as from 0.005 to 0.1 M, including from 0.01 to 0.5 M, divalent anions, such as sulfate ($SO_4^{2-}$) at a concentration ranging from 0.005 to 1 moles per liter (M), such as from 0.005 to 0.1 M, including from 0.01 to 0.5 M.

Aspects of the methods further include contacting the regenerated aqueous capture ammonia with a gaseous source of $CO_2$, e.g., as described above, under conditions sufficient to produce a $CO_2$ sequestering carbonate, e.g., as described above. In other words, the methods include recycling the regenerated ammonia into the process. In such instances, the regenerated aqueous capture ammonia may be used as the sole capture liquid, or combined with another liquid, e.g., make up water, to produce an aqueous capture ammonia suitable for use as a $CO_2$ capture liquid. Where the regenerated aqueous ammonia is combined with additional water, any convenient water may be employed. Waters of interest from which the aqueous capture ammonia may be produced include, but are not limited to, freshwaters, seawaters, brine waters, produced waters and waste waters.

In some embodiments an additive is present in the cation source and/or in the aqueous ammonia capture liquid regenerated from the aqueous ammonium salt, e.g., as described below. Additives may include, e.g., ionic species such as magnesium ($Mg^{2+}$), strontium ($Sr^{2+}$), barium ($Ba^{2+}$), radium ($Ra^{2+}$), ammonium ($NH_4^+$), sulfate ($SO_4^{2-}$), phosphates ($PO_4^{3-}$, $HPO_4^{2-}$, or $H_2PO_4$), carboxylate groups such as, e.g., oxylate, carbamate groups such as, e.g., $H_2NCOO^-$, transition metal cations such as, e.g., manganese (Mn), copper (Cu), nickel (Ni), zinc (Zn), cadmium (Cd), chromium (Cr). In some instances, the additives are intentionally added to the cation source and/or to the aqueous ammonia capture liquid regenerated from the aqueous ammonium salt. In other instances, the additives are extracted from an alkalinity source, e.g., from geomass such as described above, during some embodiments of the method. In some embodiments the additive has an effect on the reactivity of the $CO_2$ sequestering carbonate precipitate, for example, in some instances, the calcium carbonate slurry has no detectable calcite morphology, and may be amorphous calcium carbonate (ACC), vaterite, aragonite or other morphology, including any combination of such morphologies.

FIG. 1 provides a schematic diagram of an embodiment of the invention, which includes the input of energy and may be viewed as a "hot" process. As shown in FIG. 1, $CO_2$ containing flue gas and aqueous ammonia ($NH_3$ (aq)) are combined in a $CO_2$ capture module, which results in the production of $CO_2$ depleted flue gas and aqueous ammonium carbonate $(NH_4)_2CO_3$ (aq). The aqueous ammonium carbonate is then combined with aqueous calcium chloride ($CaCl_2$)(a)) and aqueous ammonium chloride ($NH_4Cl$ (aq)), as well as upcycled geomass (e.g., from a reformation module and or new aggregate substrate in a carbonate coating module, where calcium carbonate precipitates and coats the upcycled geomass and/or new aggregate substrate to produce an aggregate product that includes a coating of a $CO_2$ sequestering carbonate material. In addition to the aggregate product, the carbonate coating module yields aqueous ammonium salt, specifically aqueous ammonium chloride ($NH_4Cl$ (aq)), which aqueous ammonium salt is then conveyed to a reformation module. In the reformation module, the aqueous ammonium salt is combined with a solid geomass (CaO(s)) to yield geomass aggregate which may be upcycled and an initial regenerated aqueous ammonia liquid, which includes aqueous ammonia ($NH_3$ (aq)), aqueous calcium chloride ($CaCl_2$ (aq)) and aqueous ammonium chloride ($NH_4Cl$ (aq)). The initial regenerated aqueous ammonia liquid is then conveyed to a stripper module, where heat provided by steam is employed to still aqueous ammonia ($NH_3$ (aq)) capture liquid from the initial regenerated liquid. (It is noted that, in FIG. 1, chemical equations are not balanced and are for illustrative purposes only).

Figure 2:
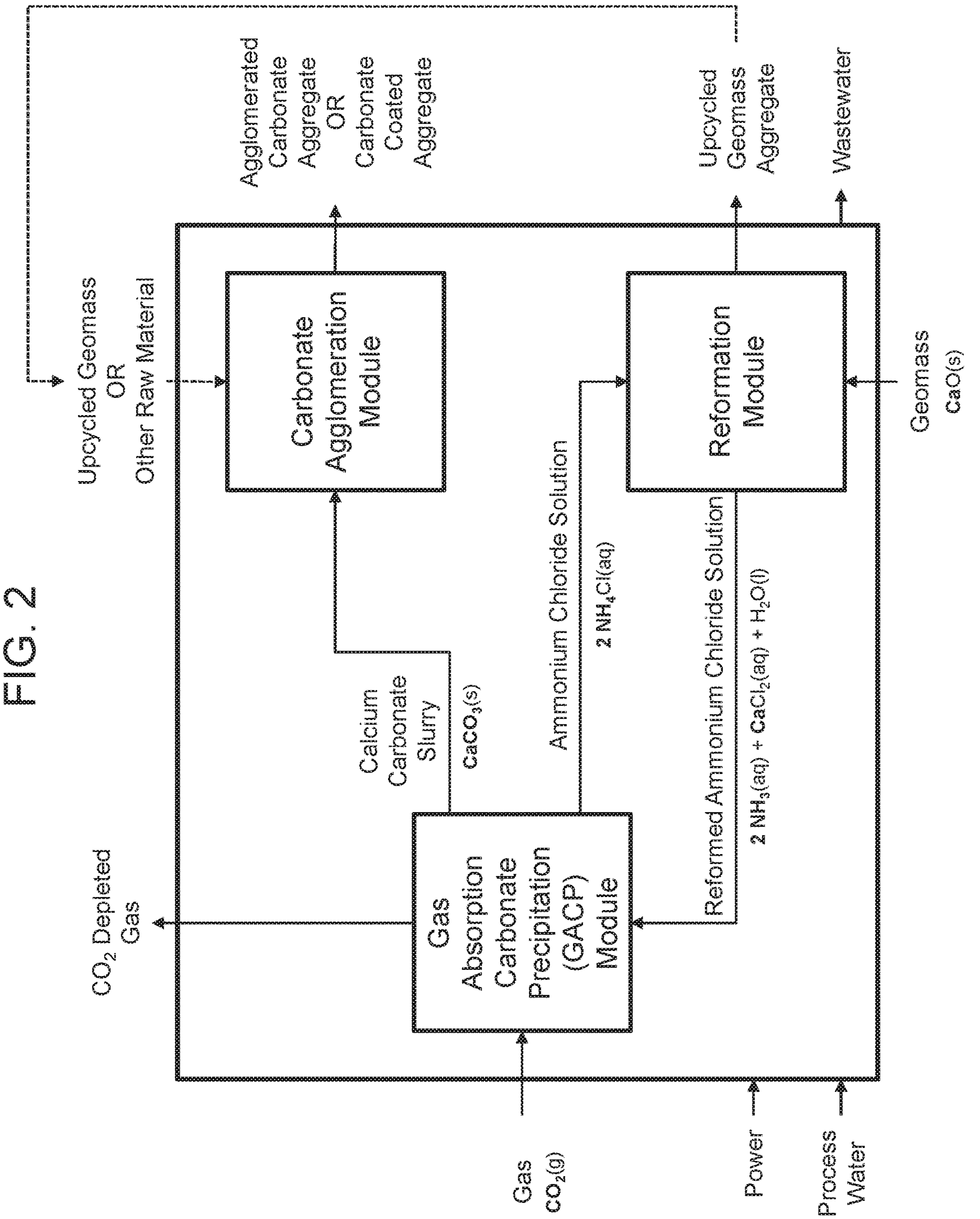
FIG. 2 provides a schematic representation of a method according to an embodiment of the invention, where the method combines regenerated aqueous capture liquid and flue gas to produce a $CO_2$ sequestering carbonate precipitate.

FIG. 2 provides a schematic diagram of another embodiment of the invention in which no steam stripping or high-pressure systems are employed, such that the process depicted may be viewed as a cold process. As shown in FIG. 2, a $CO_2$ rich gas, such as flue gas, is combined with an aqueous ammonia ($NH_3$ (aq)) capture liquid that also includes aqueous calcium chloride ($CaCl_2$) (aq)) and aqueous ammonium chloride ($NH_4Cl$ (aq)) in a Gas Absorption Carbonate Precipitation (GACP) Module, which results in the production of $CO_2$ depleted gas and a calcium carbonate slurry ($CaCO_3$ (s)). In the gas absorption carbonate precipitation (GACP) module, the suspension from the reformation module, either as an aqueous solution with suspended solids or as an aqueous solution free from solids, is contacted directly with a gaseous source of carbon dioxide ($CO_2$) thereby producing solid calcium carbonate ($CaCO_3$) inside the module. In the GACP module, the pH may be basic, in some instances 9 or higher, the aqueous ammonia (or alkalinity) concentration may be 0.20 mol/L or higher and the calcium ion concentration may be 0.10 mol/L or higher. The temperature in GACP may vary, in some instances ranging from 10 to 40, such as 15 to 35° C., where in some instances the temperature is ambient temperature or lower, ranging from 2 to 10, such as 2 to 5° C. In some instances the aqueous ammonia capture liquid feeding into the GACP module is cooled using a heat source, e.g., a waste heat source, such as hot flue gas from a power plant, and principles of adsorption or absorption, e.g., using an adsorption or absorption refrigerator or chiller that, with a heat source input, provide the energy needed to drive the cooling process. With respect to the calcium carbonate slurry produced by the GACP, in some instances, the slurry precipitated calcium carbonate has no detectable calcite morphology, and may be amorphous (ACC), vaterite, aragonite or other morphology, including any combination of such morphologies. The resultant calcium carbonate slurry is then conveyed to a carbonate agglomeration module, where it is combined with upcycled geomass (e.g., from a reformation module) and/or new aggregate substrate to produce an agglomerated aggregate product that includes a $CO_2$ sequestering carbonate material. In the carbonate agglomeration module, the $CaCO_3$ slurry from a GACP module is processed to produce aggregate rocks for concrete, either as pure $CaCO_3$ rocks or as a mixture of $CaCO_3$ and geomass dust/superfine material from a reformation module. In addition to the calcium carbonate slurry ($CaCO_3$ (s)), the GACP module also produces aqueous ammonium chloride($NH_4Cl$ (aq)), which aqueous ammonium chloride($NH_4Cl$ (aq)) is then conveyed to a reformation module. In the reformation module, the aqueous ammonium chloride($NH_4Cl$ (aq)) is combined with a solid geomass (CaO (s)) to yield geomass aggregate which may be upcycled and a regenerated aqueous ammonia liquid, which includes aqueous ammonia ($NH_3$ (aq)), aqueous calcium chloride ($CaCl_2$ (a)) and aqueous ammonium chloride ($NH_4Cl$ (aq)). In the reformation module, metal oxides, e.g., calcium oxide (CaO), are extracted by mixing geomass with an aqueous ammonium chloride ($NH_4Cl$) solution from a gas absorption carbonate precipitation (GACP) module, resulting in partial reformation of ammonium ($NH_4^+$) ions into aqueous ammonia ($NH_3$) and in dissolution of calcium ($Ca^{2+}$) ions from the geomass. The regenerated aqueous ammonia liquid is then conveyed to GACP module. (It is noted that, in FIG. 2, chemical equations are not balanced and are for illustrative purposes only). Where desired, e.g., to remove and recover chemical species, e.g., ammonium chloride ($NH_4Cl$), calcium ions, aqueous ammonia, etc., from the surfaces and pores of the reformed geomass and from the calcium carbonate ($CaCO_3$) slurry, the materials may be washed using one or more of the following techniques before final dewatering: (a) steaming, e.g., using low grade steam, waste heat from hot flue gas, etc., in a humidity chamber, etc.; (b) soaking, e.g., letting low salinity water diffuse into pores of aggregates so as to extract the desirable chemical species; (c) sonication, e.g., applying ultrasonic frequencies to continuous or batch processes so as to shock the aggregates into releasing desirable chemical species; and (d) chemical additions, e.g., using additives to chemically neutralize the aggregates.

In some instances, the $CO_2$ gas/aqueous capture ammonia module comprises a combined capture and alkali enrichment reactor, the reactor comprising: a core hollow fiber membrane component (e.g., one that comprises a plurality of hollow fiber membranes); an alkali enrichment membrane component surrounding the core hollow fiber membrane component and defining a first liquid flow path in which the core hollow fiber membrane component is present; and a housing configured to contain the alkali enrichment membrane component and core hollow fiber membrane component, wherein the housing is configured to define a second liquid flow path between the alkali enrichment membrane component and the inner surface of the housing. In some instances, the alkali enrichment membrane component is configured as a tube and the hollow fiber membrane component is axially positioned in the tube. In some instances, the housing is configured as a tube, wherein the housing and the alkali enrichment membrane component are concentric. Aspects of the invention further include a combined capture and alkali enrichment reactor, e.g., as described above.

Further details regarding the above described "hot" and "cold" processes are found in PCT application serial no. PCT/US2019/048790, the disclosure of which is herein incorporated by reference.

The product carbonate compositions may vary greatly. The precipitated product may include one or more different carbonate compounds, such as two or more different carbonate compounds, e.g., three or more different carbonate compounds, five or more different carbonate compounds, etc., including non-distinct, amorphous carbonate compounds. Carbonate compounds of precipitated products of the invention may be compounds having a molecular formulation $X_m(CO_3)_n$ where X is any element or combination of elements that can chemically bond with a carbonate group or its multiple, wherein X is in certain embodiments an alkaline earth metal and not an alkali metal; wherein m and n are stoichiometric positive integers. These carbonate compounds may have a molecular formula of $X_m(CO_3)_n \cdot H_2O$, where there are one or more structural waters in the molecular formula. The amount of carbonate in the product, as determined by coulometry using the protocol described as coulometric titration, may be 40% or higher, such as 70% or higher, including 80% or higher.

The carbonate compounds of the precipitated products may include a number of different cations, such as but not limited to ionic species of: calcium, magnesium, sodium, potassium, sulfur, boron, silicon, strontium, and combinations thereof. Of interest are carbonate compounds of divalent metal cations, such as calcium and magnesium carbonate compounds. Specific carbonate compounds of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 \cdot 6H_2O$), and amorphous calcium carbonate ($CaCO_3$). Magnesium carbonate minerals of interest include, but are not limited to magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$), hydromagnisite, and amorphous magnesium calcium carbonate ($MgCO_3$). Calcium magnesium carbonate minerals of interest include, but are not limited to dolomite $(CaMg)(CO_3)_2)$, huntite ($Mg_3Ca(CO_3)_4$) and sergeevite ($Ca_2Mg_{11}(CO_3)_{13} \cdot H_2O$). Also of interest are carbonate compounds formed with Na, K, Al, Ba, Cd, Co, Cr, As, Cu, Fe, Pb, Mn, Hg, Ni, V, Zn, etc. The carbonate compounds of the product may include one or more waters of hydration, or may be anhydrous. In some instances, the amount by weight of magnesium carbonate compounds in the precipitate exceeds the amount by weight of calcium carbonate compounds in the precipitate. For example, the amount by weight of magnesium carbonate compounds in the precipitate may exceed the amount by weight calcium carbonate compounds in the precipitate by 5% or more, such as 10% or more, 15% or more, 20% or more, 25% or more, 30% or more. In some instances, the weight ratio of magnesium carbonate compounds to calcium carbonate compounds in the precipitate ranges from 1.5-5 to 1, such as 2-4 to 1 including 2-3 to 1. In some instances, the precipitated product may include hydroxides, such as divalent metal ion hydroxides, e.g., calcium and/or magnesium hydroxides.

Further details regarding carbonate production and methods of using the carbonated produced thereby are provided in: U.S. application Ser. No. 14/204,994 published as US-2014-0322803-A1; Ser. No. 14/214,129 published as US 2014-0271440 A1; Ser. No. 14/861,996 published as US 2016-0082387 A1 and Ser. No. 14/877,766 published as US 2016-0121298 A1; as well as U.S. Pat. Nos. 9,707,513 and 9,714,406; the disclosures of which are herein incorporated by reference.

Carbonate slurries employed in methods of the invention may also be prepared using non-$CO_2$ sequestering protocols, such as protocols in which a soluble metal cation reactant and a soluble carbonate anion reactant are combined under conditions sufficient to precipitate a solid metal carbonate.

Where desired the carbonate slurry may be washed one or more times. Where desired, one or more additives may be introduced into the carbonate slurry. In some instances, the slurry may be prepared through rewetting of a dried carbonate composition, such as a dried carbonate powder.

Producing a Carbonate Aggregate from the Carbonate Slurry

Following production of a carbonate slurry, e.g., as described above, the carbonate slurry is introduced into a revolving drum and mixed in the revolving drum under conditions sufficient to produce a carbonate aggregate. In some instances, the carbonate slurry is introduced into the revolving drum with an aggregate substrate and then mixed in the revolving drum to produce a carbonate coated aggregate. In some instances, the slurry (and substrate) are introduced into the revolving drum and mixing is commenced shortly after production of the carbonate slurry, such as within 12 hours, such as within 6 hours and including within 4 hours of preparing the carbonate slurry. In some instances, the entire process (i.e., from commencement of slurry preparation to obtainment of carbonate aggregate product) is performed in 15 hours or less, such as 10 hours or less, including 5 hours or less, e.g., 3 hours or less, including 1 hour less.

When employed, any convenient aggregate substrate may be used. Examples of suitable aggregate substrates include, but are not limited to: natural mineral aggregate materials, e.g., carbonate rocks, sand (e.g., natural silica sand), sandstone, gravel, granite, diorite, gabbro, basalt, etc.; and synthetic aggregate materials, such as industrial byproduct aggregate materials, e.g., blast-furnace slag, fly ash, municipal waste, and recycled concrete, etc. In these instances, the aggregate substrate includes a material that is different from the particles of the carbonate slurry. In other instances, the substrate may be the aggregate formed from the process described herein from an earlier production. In some cases, that like substrate may be an agglomeration of non-carbonate particles agglomerated together with the carbonate slurry in the earlier production cycle, especially when finer core substrate grains are employed. Such agglomerated composite substrates may have certain benefits, such as having a light weigh characteristic, bestowing the final aggregate with properties suitable for light weight concrete, or have a greater proportion of the aggregate comprising $CO_2$-sequestered carbonate, increase the $CO_2$ sequestration potential of the aggregate when deployed in concrete, thus lowering the embodied $CO_2$ of the concrete in a lifecycle analysis.

The carbonate slurry, and aggregate substrate when present, is mixed in the revolving drum for a period of time sufficient to produce the desired carbonate aggregate. While the period of time may vary, in some instances the period of time ranges from 10 min to 5 hours, such as 15 min to 3 hours or more.

During and/or following mixing, the resultant carbonate aggregate may be dried. Where desired, drying may be achieved using any convenient protocol. In some instances, drying the resultant carbonate aggregate may occur during production, e.g., by application of heat during mixing. Such protocols include, e.g., direct heating of the mixing vessel, e.g., using waste energy to supply the heat, or, e.g., heating the inside of the mixing vessel with, e.g., hot flue gas from a fossil fuel combustion process, so that the temperature of the internal atmosphere where the carbonate aggregate is being produced is between 15° C. and 260° C., or between 15° C. and 30° C., or 15° C. and 50° C., or 15° C. and 200° C., or between or 20° C. and 200° C., such as 20° C. and 60° C., or 25° C. and 75° C., or 25° C. and 150° C., or between 30° C. and 250° C., such as 30° C. and 150° C., or 30° C. and 200° C., and including between 40° C. and 250° C., to dry the carbonate aggregate. In other instances, drying the resultant carbonate aggregate may occur after production, e.g., after the aggregate has exited the mixing and/or aggregate production vessel. Convenient protocols include drying the resultant carbonate aggregate in open atmosphere under ambient conditions, e.g., outside in an aggregate storage bay and/or silo at a production plant or, e.g., in a covered dome or enclosed container away from outside elements. In some instances of the embodiment, the method of drying may include curing the resultant aggregate, e.g., as described below. In other instances of the embodiment, the method may not involve drying the resultant carbonate aggregate.

Where desired, the methods may include curing the resultant aggregate product, which is specific to the portion of the aggregate product that is comprised of the carbonate that came from the slurry. If no substrate is present, then the curing may occur within the carbonate itself. If substrate and/or composite is present, then the curing may occur within both the carbonate itself, but also between the carbonate and the other material that is present. The method of curing may take place in open air, in water, in water with added chemicals, in air then in water, in a temperature & humidity controlled chamber, under UV, microwave or other form of radiation, or even in the drum itself during production of the carbonate aggregate, as desired. Time to cure ranges from several seconds if using radiation, to several minutes if happening in the drum during production, to hours or even days if curing in air, water, etc. Another aspect of the curing is the morphology of the $CO_2$ sequestered carbonate precipitate. For example, for $CO_2$ sequestered carbonate precipitate that is comprised of calcium carbonate, the vaterite morphology is observed at the slurry stage and in early curing stages, along with amorphous calcium carbonate (ACC) phases. As the carbonate aggregate cures and effectively dehydrates, aragonite and calcite begin to form, and the ACC phases disappear.

Where the carbonate slurry is mixed with an aggregate substrate in a revolving drum, the resultant carbonate aggregate is a carbonate coated aggregate, where the particulate members of the aggregate include a core material at least partially, if not completely, coated by a carbonate material. In some cases, especially with finer core grains, the carbonate slurry binds more than one particle of core material together into an agglomerated composite.

Where the carbonate coating is produced using a $CO_2$ sequestering process, e.g., as described above, the resultant aggregate compositions may be considered to be $CO_2$ sequestering aggregate compositions. In some instances, the $CO_2$ sequestering aggregate compositions include aggregate particles having a core and a $CO_2$ sequestering carbonate coating on at least a portion of a surface of the core. The $CO_2$ sequestering carbonate coating is made up of a $CO_2$ sequestering carbonate material. By "$CO_2$ sequestering carbonate material" is meant a material that stores a significant amount of $CO_2$ in a storage-stable format, such that $CO_2$ gas is not readily produced from the material and released into the atmosphere. In certain embodiments, the $CO_2$-sequestering material includes 5% or more, such as 10% or more, including 25% or more, for instance 50% or more, such as 75% or more, including 90% or more of $CO_2$, e.g., present as one or more carbonate compounds. In additional embodiments, the $CO_2$-sequestering material may form independent particles of 100% without a substrate particle. The $CO_2$-sequestering materials present in coatings in accordance with the invention may include one or more carbonate compounds, e.g., as described in greater detail below. The amount of carbonate in the $CO_2$-sequestering material, e.g., as determined by coulometry, may be 10% or higher, 20% or higher 40% or higher, such as 70% or higher, including 80% or higher, such as 100% when the particle form without a core substrate, or the core substrate is a particle that formed without a core substrate.

$CO_2$ sequestering materials, e.g., as described herein, provide for long-term, or permanent, storage of $CO_2$ in a manner such that $CO_2$ is sequestered (i.e., fixed) in the material, where the sequestered $CO_2$ does not become part of the atmosphere. When the material is maintained under conditions conventional for its intended use, the material keeps sequestered $CO_2$ fixed for extended periods of time (e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer) without significant, if any, release of the $CO_2$ from the material. With respect to the $CO_2$-sequestering materials, when they are employed in a manner consistent with their intended use and over their lifetime, the amount of degradation, if any, as measured in terms of $CO_2$ gas release from the product will not exceed 1% per year, such as 0.5% per year, and in certain embodiments, 0.1% per year. In some instances, $CO_2$-sequestering materials provided by the invention do not release more than 1%, 5%, or 10% of their total $CO_2$ when exposed to normal conditions of temperature and moisture, including rainfall of normal pH, for there intended use, for at least 1, 2, 5, 10, or 20 years, or for more than 20 years, for example, for more than 100 years. Any suitable surrogate marker or test that is reasonably able to predict such stability may be used. For example, an accelerated test comprising conditions of elevated temperature and/or moderate to more extreme pH conditions is reasonably able to indicate stability over extended periods of time. For example, depending on the intended use and environment of the composition, a sample of the composition may be exposed to 50, 75, 90, 100, 120, or 150° C. for 1, 2, 5, 25, 50, 100, 200, or 500 days at between 10% and 50% relative humidity, and a loss less than 1%, 2%, 3%, 4%, 5%, 10%, 20%, 30%, or 50% of its carbon may be considered sufficient evidence of stability of materials of the invention for a given period (e.g., 1, 10, 100, 1000, 1,000,000, 1,000,000,000 or more than 1,000,000,000 years, such as the pre-Cambrian limestones and dolostones in Earth's lithospheric crust).

The $CO_2$ sequestering carbonate material that is present in coatings of the coated particles of the subject aggregate compositions may vary. In some instances, the carbonate material is a highly reflective microcrystalline/amorphous carbonate material. The microcrystalline/amorphous materials present in coatings of the invention may be highly reflective. As the materials may be highly reflective, the coatings that include the same may have a high total surface reflectance (TSR) value. TSR may be determined using any convenient protocol, such as ASTM E1918 Standard Test Method for Measuring Solar Reflectance of Horizontal and Low-Sloped Surfaces in the Field (see also R. Levinson, H. Akbari, P. Berdahl, Measuring solar reflectance—Part II: review of practical methods, LBNL 2010). In some instances, the backsheets exhibit a TSR value ranging from $R_g$,0=0.0 to $R_g$,0=1.0, such as $R_g$,0=0.25 to $R_g$,0=0.99, including $R_g$,0=0.40 to $R_g$,0=0.98, e.g., as measured using the protocol referenced above.

In some instances, the coatings that include the carbonate materials are highly reflective of near infra-red (NIR) light, ranging in some instances from 10 to 99%, such as 50 to 99%. By NIR light is meant light having a wavelength ranging from 700 nanometers (nm) to 2.5 mm. NIR reflectance may be determined using any convenient protocol, such as ASTM C1371-04a(2010)e1 Standard Test Method for Determination of Emittance of Materials Near Room Temperature Using Portable Emissometers (http://www.astm.org/Standards/C1371.htm) or ASTM G173-03(2012) Standard Tables for Reference Solar Spectral Irradiances: Direct Normal and Hemispherical on 37° Tilted Surface (http://rredc.nrel.gov/solar/spectra/am1.5/ASTMG173/ASTMG173.html). In some instances, the coatings exhibit a NIR reflectance value ranging from Rg;0=0.0 to Rg;0=1.0, such as Rg;0=0.25 to Rg;0=0.99, including Rg;0=0.40 to Rg;0=0.98, e.g., as measured using the protocol referenced above.

In some instances, the carbonate coatings are highly reflective of ultra-violet (UV) light, ranging in some instances from 10 to 99%, such as 50 to 99%. By UV light is meant light having a wavelength ranging from 400 nm and 10 nm. UV reflectance may be determined using any convenient protocol, such as ASTM G173-03(2012) Standard Tables for Reference Solar Spectral Irradiances: Direct Normal and Hemispherical on 37° Tilted Surface. In some instances, the materials exhibit a UV value ranging from $R_g$,0=0.0 to $R_g$,0=1.0, such as $R_g$,0=0.25 to $R_g$,0=0.99, including $R_g$,0=0.4 to $R_g$,0=0.98, e.g., as measured using the protocol referenced above.

In some instances, the coatings are reflective of visible light, e.g., where reflectivity of visible light may vary, ranging in some instances from 10 to 99%, such as 10 to 90%. By visible light is meant light having a wavelength ranging from 380 nm to 740 nm. Visible light reflectance properties may be determined using any convenient protocol, such as ASTM G173-03(2012) Standard Tables for Reference Solar Spectral Irradiances: Direct Normal and Hemispherical on 37° Tilted Surface. In some instances, the coatings exhibit a visible light reflectance value ranging from $R_g$,0=0.0 to $R_g$,0=1.0, such as $R_g$,0=0.25 to $R_g$,0=0.99, including $R_g$,0=0.4 to $R_g$,0=0.98, e.g., as measured using the protocol referenced above.

The materials making up the carbonate components are, in some instances, amorphous or microcrystalline. Where the materials are microcrystalline, the crystal size, e.g., as determined using the Scherrer equation applied to the FWHM of X-ray diffraction pattern, is small, and in some instances is 1000 microns or less in diameter, such as 100 microns or less in diameter, and including 10 microns or less in diameter. In some instances, the crystal size ranges in diameter from 1000 μm to 0.001 μm, such as 10 to 0.001 μm, including 1 to 0.001 μm. In some instances, the crystal size is chosen in view of the wavelength(s) of light that are to be reflected. For example, where light in the visible spectrum is to be reflected, the crystal size range of the materials may be selected to be less than one-half the "to be reflected" range, so as to give rise to photonic band gap. For example, where the to be reflected wavelength range of light is 100 to 1000 nm, the crystal size of the material may be selected to be 50 nm or less, such as ranging from 1 to 50 nm, e.g., 5 to 25 nm. In some embodiments, the materials produced by methods of the invention may include rod-shaped crystals and amorphous solids. The rod-shaped crystals may vary in structure, and in certain embodiments have length to diameter ratio ranging from 500 to 1, such as 10 to 1. In certain embodiments, the length of the crystals ranges from 0.5 μm to 500 μm, such as from 5 μm to 100 μm. In yet other embodiments, substantially completely amorphous solids are produced.

The density, porosity, and permeability of the coating materials may vary according to the application. With respect to density, while the density of the material may vary, in some instances the density ranges from 5 g/cm$^3$ to 0.01 g/cm$^3$, such as 3 g/cm$^3$ to 0.3 g/cm$^3$ and including 2.7 g/cm$^3$ to 0.4 g/cm$^3$. With respect to porosity, as determined by Gas Surface Adsorption as determined by the BET method (Brown Emmett Teller (e.g., as described at http://en.wikipedia.org/wiki/BET_theory, S. Brunauer, P. H. Emmett and E. Teller, *J. Am. Chem. Soc.,* 1938, 60, 309. doi:10.1021/ja01269a023) the porosity may range in some instances from 100 m$^2$/g to 0.1 m$^2$/g, such as 60 m$^2$/g to 1 m$^2$/g and including 40 m$^2$/g to 1.5 m$^2$/g. With respect to permeability, in some instances the permeability of the material may range from 0.1 to 100 darcies, such as 1 to 10 darcies, including 1 to 5 darcies (e.g., as determined using the protocol described in H. Darcy, Les Fontaines Publiques de la Ville de Dijon, Dalmont, Paris (1856).). Permeability may also be characterized by evaluating water absorption of the material. As determined by water absorption protocol, e.g., the water absorption of the material ranges, in some embodiments, from 0 to 25%, such as 1 to 15% and including from 2 to 9%.

The hardness of the materials may also vary. In some instances, the materials exhibit a Mohs hardness of 3 or greater, such as 5 or greater, including 6 or greater, where the hardness ranges in some instances from 3 to 8, such as 4 to land including 5 to 6 Mohs (e.g., as determined using the protocol described in American Federation of Mineralogical Societies. "Mohs Scale of Mineral Hardness"). Hardness may also be represented in terms of tensile strength, e.g., as determined using the protocol described in ASTM C1167. In some such instances, the material may exhibit a compressive strength of 100 to 3000 N, such as 400 to 2000 N, including 500 to 1800 N.

As reviewed above, carbonate coatings of the invention include one or more carbonate materials. By carbonate material is meant a material or composition that includes one or more carbonate compounds, such as two or more different carbonate compounds, e.g., three or more different carbonate compounds, five or more different carbonate compounds, etc., including non-distinct, amorphous carbonate compounds. Carbonate compounds of interest may be compounds having a molecular formulation $X_m(CO_3)_n$ where X is any element or combination of elements that can chemically bond with a carbonate group or its multiple, wherein X is in certain embodiments an alkaline earth metal and not an alkali metal; wherein m and n are stoichiometric positive integers. These carbonate compounds may have a molecular formula of $X_m(CO_3)_n \cdot H_2O$, where there are one or more structural waters in the molecular formula. The amount of carbonate in the carbonate compounds of the carbonate material, as determined by coulometry using the protocol described as coulometric titration, may be 40% or higher, such as 70% or higher, including 80% or higher. Carbonate compounds of interest are those having a reflectance value across the visible spectrum of 0.05 or greater, such as 0.6 or greater, 0.7 or greater, 0.8 or greater, 0.9 or greater, including 0.95 or greater.

The carbonate compounds may include a number of different cations, such as but not limited to ionic species of: calcium, magnesium, sodium, potassium, sulfur, boron, silicon, strontium, and combinations thereof. Of interest are carbonate compounds of divalent metal cations, such as calcium and magnesium carbonate compounds. Specific carbonate compounds of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), amorphous vaterite precursor/anhydrous amorphous carbonate ($CaCO_3$), vaterite ($CaCO_3$), ikaite ($CaCO_3 \cdot 6H_2O$), and amorphous calcium carbonate ($CaCO_3$). Magnesium carbonate minerals of interest include, but are not limited to magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$), hydromagnisite, and amorphous magnesium calcium carbonate ($MgCaCO_3$). Calcium magnesium carbonate minerals of interest include, but are not limited to dolomite ($CaMg(CO_3)_2$), huntite ($Mg_3Ca(CO_3)_4$) and sergeevite ($Ca_2Mg_{11}(CO_3)_{13} \cdot H_2O$). Also of interest are bicarbonate compounds, e.g., sodium bicarbonate, potassium bicarbonate, etc. The carbonate compounds may include one or more waters of hydration, or may be anhydrous. In some instances, the amount by weight of magnesium carbonate compounds in the precipitate exceeds the amount by weight of calcium carbonate compounds in the precipitate. For example, the amount by weight of magnesium carbonate compounds in the precipitate may exceed the amount by weight calcium carbonate compounds in the precipitate by 5% or more, such as 10% or more, 15% or more, 20% or more, 25% or more, 30% or more. In some instances, the weight ratio of magnesium carbonate compounds to calcium carbonate compounds in the precipitate ranges from 1.5-5 to 1, such as 2-4 to 1 including 2-3 to 1.

In some instances, the carbonate material may further include hydroxides, such as divalent metal ion hydroxides, e.g., calcium and/or magnesium hydroxides. The carbonate compounds may include one or more components that serve as identifying components, where these one more components may identify the source of the carbonate compounds. For example, identifying components that may be present in product carbonate compound compositions include, but are not limited to: chloride, sodium, sulfur, potassium, bromide, silicon, strontium, magnesium and the like. Any such source-identifying or "marker" elements are generally present in small amounts, e.g., in amounts of 20,000 ppm or less, such as amounts of 2000 ppm or less. In certain embodiments, the "marker" compound is strontium, which may be present in the precipitate incorporated into the aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The identifying component of the compositions may vary depending on the particular medium source, e.g., ocean water, lagoon water, brine, etc. In certain embodiments, the calcium carbonate content of the carbonate material is 25% w/w or higher, such as 40% w/w or higher, and including 50% w/w or higher, e.g., 60% w/w. The carbonate material has, in certain embodiments, a calcium/magnesium ratio that is influenced by, and therefore reflects, the water source from which it has been precipitated. In certain embodiments, the calcium/magnesium molar ratio ranges from 10/1 to 1/5 Ca/Mg, such as 5/1 to 1/3 Ca/Mg. In certain embodiments, the carbonate material is characterized by having a water source identifying carbonate to hydroxide compound ratio, where in certain embodiments this ratio ranges from 100 to 1, such as 10 to 1 and including 1 to 1. In some instances, the carbonate material may further include one or more additional types of non-carbonate compounds, such as but not limited to: silicates, sulfates, sulfites, phosphates, arsenates, etc.

In some embodiments, the carbonate material includes one or more contaminants predicted not to leach into the environment by one or more tests selected from the group consisting of Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, and Multiple Extraction Procedure. Tests and combinations of tests may be chosen depending upon likely contaminants and storage conditions of the composition. For example, in some embodiments, the composition may include As, Cd, Cr, Hg, and Pb (or products thereof), each of which might be found in a waste gas stream of a coal-fired power plant. Since TCLP tests for As, Ba, Cd, Cr, Pb, Hg, Se, and Ag, TCLP may be an appropriate test for aggregates described herein. In some embodiments, a carbonate composition of the invention includes As, wherein the composition is predicted not to leach As into the environment. For example, a TCLP extract of the composition may provide less than 5.0 mg/L As indicating that the composition is not hazardous with respect to As. In some embodiments, a carbonate composition of the invention includes Cd, wherein the composition is predicted not to leach Cd into the environment. For example, a TCLP extract of the composition may provide less than 1.0 mg/L Cd indicating that the composition is not hazardous with respect to Cd. In some embodiments, a carbonate composition of the invention includes Cr, wherein the composition is predicted not to leach Cr into the environment. For example, a TCLP extract of the composition may provide less than 5.0 mg/L Cr indicating that the composition is not hazardous with respect to Cr. In some embodiments, a carbonate composition of the invention includes Hg, wherein the composition is predicted not to leach Hg into the environment. For example, a TCLP extract of the composition may provide less than 0.2 mg/L Hg indicating that the composition is not hazardous with respect to Hg. In some embodiments, a carbonate composition of the invention includes Pb, wherein the composition is predicted not to leach Pb into the environment. For example, a TCLP extract of the composition may provide less than 5.0 mg/L Pb indicating that the composition is not hazardous with respect to Pb. In some embodiments, a carbonate composition and aggregate that includes of the same of the invention may be non-hazardous with respect to a combination of different contaminants in a given test. For example, the carbonate composition may be non-hazardous with respect to all metal contaminants in a given test. A TCLP extract of a composition, for instance, may be less than 5.0 mg/L in As, 100.0 mg/L in Ba, 1.0 mg/L in Cd, 5.0 mg/mL in Cr, 5.0 mg/L in Pb, 0.2 mg/L in Hg, 1.0 mg/L in Se, and 5.0 mg/L in Ag. Indeed, a majority if not all of the metals tested in a TCLP analysis on a composition of the invention may be below detection limits. In some embodiments, a carbonate composition of the invention may be non-hazardous with respect to all (e.g., inorganic, organic, etc.) contaminants in a given test. In some embodiments, a carbonate composition of the invention may be non-hazardous with respect to all contaminants in any combination of tests selected from the group consisting of Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, and Multiple Extraction Procedure. As such, carbonate compositions and aggregates including the same of the invention may effectively sequester $CO_2$ (e.g., as carbonates, bicarbonates, or a combinations thereof) along with various chemical species (or co-products thereof) from waste gas streams, industrial waste sources of divalent cations, industrial waste sources of proton-removing agents, or combinations thereof that might be considered contaminants if released into the environment. Compositions of the invention incorporate environmental contaminants (e.g., metals and co-products of metals such as Hg, Ag, As, Ba, Be, Cd, Co, Cr, Cu, Mn, Mo, Ni, Pb, Sb, Se, TI, V, Zn, or combinations thereof) in a non-leachable form.

As reviewed above, the carbonate material is a $CO_2$ sequestering carbonate material. By "$CO_2$ sequestering" is meant that the material has been produced from $CO_2$, e.g., that is derived from a fuel source used by humans, including atmospheric $CO_2$ that may be derived from human activities, or from natural sources, such as plant decay by microorganisms, where the mixture of human-derived fossil fuel $CO_2$ from combustion of fossil fuel and that from decay both have a plant derived source where the $CO_2$ was originally derived from photosynthesis. For example, in some embodiments, a $CO_2$ sequestering material is produced from $CO_2$ that is obtained from the combustion of a fossil fuel, e.g., in the production of electricity. Examples of sources of such $CO_2$ include, but are not limited to, power plants, industrial manufacturing plants, etc., which combust fossil fuels and produce $CO_2$, e.g., in the form of a $CO_2$ containing gas or gases. Examples of fossil fuels include, but are not limited to, oils, coals, natural gasses, tar sands, rubber tires, biomass, shred, etc. Further details on how to produce a $CO_2$ sequestering material are provided below.

The $CO_2$ sequestering materials may have an isotopic profile that identifies the component as being of fossil fuel origin or from modern plants, both fractionating the $CO_2$ during photosynthesis, and therefore as being $CO_2$ sequestering. For example, in some embodiments the carbon atoms in the $CO_2$ materials reflect the relative carbon isotope composition ($\delta^{13}C$) of the fossil fuel (e.g., coal, oil, natural gas, tar sand, trees, grasses, agricultural plants) from which the plant-derived $CO_2$, both fossil or modern, that was used to make the material was derived. In addition to, or alternatively to, carbon isotope profiling, other isotopic profiles, such as those of oxygen ($\delta^{18}O$), nitrogen ($\delta^{15}N$), sulfur ($\delta^{34}S$), and other trace elements may also be used to identify a fossil fuel source that was used to produce an industrial $CO_2$ source from which a $CO_2$ sequestering material is derived. For example, another marker of interest is ($\delta^{18}O$). Isotopic profiles that may be employed as an identifier of $CO_2$ sequestering materials of the invention are further described in U.S. patent application Ser. No. 14/112,495 published as United States Patent Application Publication No. 2014/0234946; the disclosure of which is herein incorporated by reference.

As reviewed above, aggregate compositions of the invention include particles having a core region or regions and a $CO_2$ sequestering carbonate coating on at least a portion of a surface of the core, and in case of several core particles, connecting the core particles to form an agglomerate. The coating may cover 10% or more, 20% or more, 30% or more, 40% or more, 50% or more, 60% or more, 70% or more, 80% or more, 90% or more, including 95% or more of the surface of the core particle or particles. The thickness of the carbonate layer may vary, as desired. In some instances, the thickness may range from 0.1 μm to 25 mm, such as 1 μm to 1000 μm, including 10 μm to 500 μm.

The core of the coated particles of the aggregate compositions described herein may vary widely. The core may be made up of any convenient aggregate material. Examples of suitable aggregate materials include, but are not limited to: natural mineral aggregate materials, e.g., carbonate rocks, sand (e.g., natural silica sand), sandstone, gravel, granite, diorite, gabbro, basalt, etc.; and synthetic aggregate materials, such as industrial byproduct aggregate materials, e.g., blast-furnace slag, fly ash, municipal waste, and recycled concrete, carbonate slurry agglomerates, etc. In some instances, the core comprises a material that is different from the carbonate coating.

The physical properties of the coated particles of the aggregate compositions and agglomerated aggregate composite particles may vary. Aggregates of the invention have a density that may vary so long as the aggregate provides the desired properties for the use for which it will be employed, e.g., for the building material in which it is employed. In certain instances, the density of the aggregate particles ranges from 0.6 to 5 gm/cc, such as 1.1 to 5 gm/cc, such as 1.3 gm/cc to 3.15 gm/cc, and including 1.8 gm/cc to 2.7 gm/cc. Other particle densities in embodiments of the invention, e.g., for lightweight aggregates, may range from 1.1 to 2.2 gm/cc, e.g., 1.2 to 2.0 g/cc or 1.4 to 1.8 g/cc. In some embodiments the invention provides aggregates that range in bulk density (unit weight) from 50 lb/lb/$ft^3$ to 200 lb/$ft^3$, or 75 lb/$ft^3$ to 175 lb/$ft^3$, or 50 lb/$ft^3$ to 100 lb/$ft^3$, or 75 lb/$ft^3$ to 125 lb/$ft^3$, or lb/$ft^3$ to 115 lb/$ft^3$, or 100 lb/$ft^3$ to 200 lb/$ft^3$, or 125 lb/$ft^3$ to lb/$ft^3$, or 140 lb/$ft^3$ to 160 lb/$ft^3$, or 50 lb/$ft^3$ to 200 lb/$ft^3$. Some embodiments of the invention provide lightweight aggregate, e.g., aggregate that has a bulk density (unit weight) of 75 lb/$ft^3$ to 125 lb/$ft^3$, such as 90 lb/$ft^3$ to 115 lb/$ft^3$.

The hardness of the aggregate particles making up the aggregate compositions of the invention may also vary, and in certain instances the hardness, expressed on the Mohs scale, ranges from 1.0 to 9, such as 1 to 7, including 1 to 6 or 1 to 5. In some embodiments, the Mohr's hardness of aggregates of the invention ranges from 2-5, or 2-4. In some embodiments, the Mohs hardness ranges from 2-6. Other hardness scales may also be used to characterize the aggregate, such as the Rockwell, Vickers, or Brinell scales, and equivalent values to those of the Mohs scale may be used to characterize the aggregates of the invention; e.g., a Vickers hardness rating of 250 corresponds to a Mohs rating of 3; conversions between the scales are known in the art.

The abrasion resistance of an aggregate may also be important, e.g., for use in a roadway surface, where aggregates of high abrasion resistance are useful to keep surfaces from polishing. Abrasion resistance is related to hardness but is not the same. Aggregates of the invention include aggregates that have an abrasion resistance similar to that of natural limestone, or aggregates that have an abrasion resistance superior to natural limestone, as well as aggregates having an abrasion resistance lower than natural limestone, as measured by art accepted methods, such as ASTM C131-03. In some embodiments aggregates of the invention have an abrasion resistance of less than 50%, or less than 40%, or less than 35%, or less than 30%, or less than 25%, or less than 20%, or less than 15%, or less than 10%, when measured by ASTM C131-03.

Aggregates of the invention may also have a porosity within a particular range. As will be appreciated by those of skill in the art, in some cases a highly porous aggregate is desired, in others an aggregate of moderate porosity is desired, while in other cases aggregates of low porosity, or no porosity, are desired. Porosities of aggregates of some embodiments of the invention, as measured by water uptake after oven drying followed by full immersion for 60 minutes, expressed as % dry weight, can be in the range of 1-40%, such as 2-20%, or 2-15%, including 2-10% or even 3-9%.

The dimensions of the aggregate particles may vary. Aggregate compositions of the invention are particulate compositions that may in some embodiments be classified as fine or coarse. Fine aggregates according to embodiments of the invention are particulate compositions that almost entirely pass through a Number 4 sieve (ASTM C 125 and ASTM C 33). Fine aggregate compositions according to embodiments of the invention have an average particle size ranging from 10 μm to 4.75 mm, such as 50 μm to 3.0 mm and including 75 μm to 2.0 mm. Coarse aggregates of the invention are compositions that are predominantly retained on a Number 4 sieve (ASTM C 125 and ASTM C 33). Coarse aggregate compositions according to embodiments of the invention are compositions that have an average particle size ranging from 4.75 mm to 200 mm, such as 4.75 to 150 mm in and including 5 to 100 mm. As used herein, "aggregate" may also in some embodiments encompass larger sizes, such as 3 in to 12 in or even 3 in to 24 in, or larger, such as 12 in to 48 in, or larger than 48 in.

Representative Workflows

Figure 3:
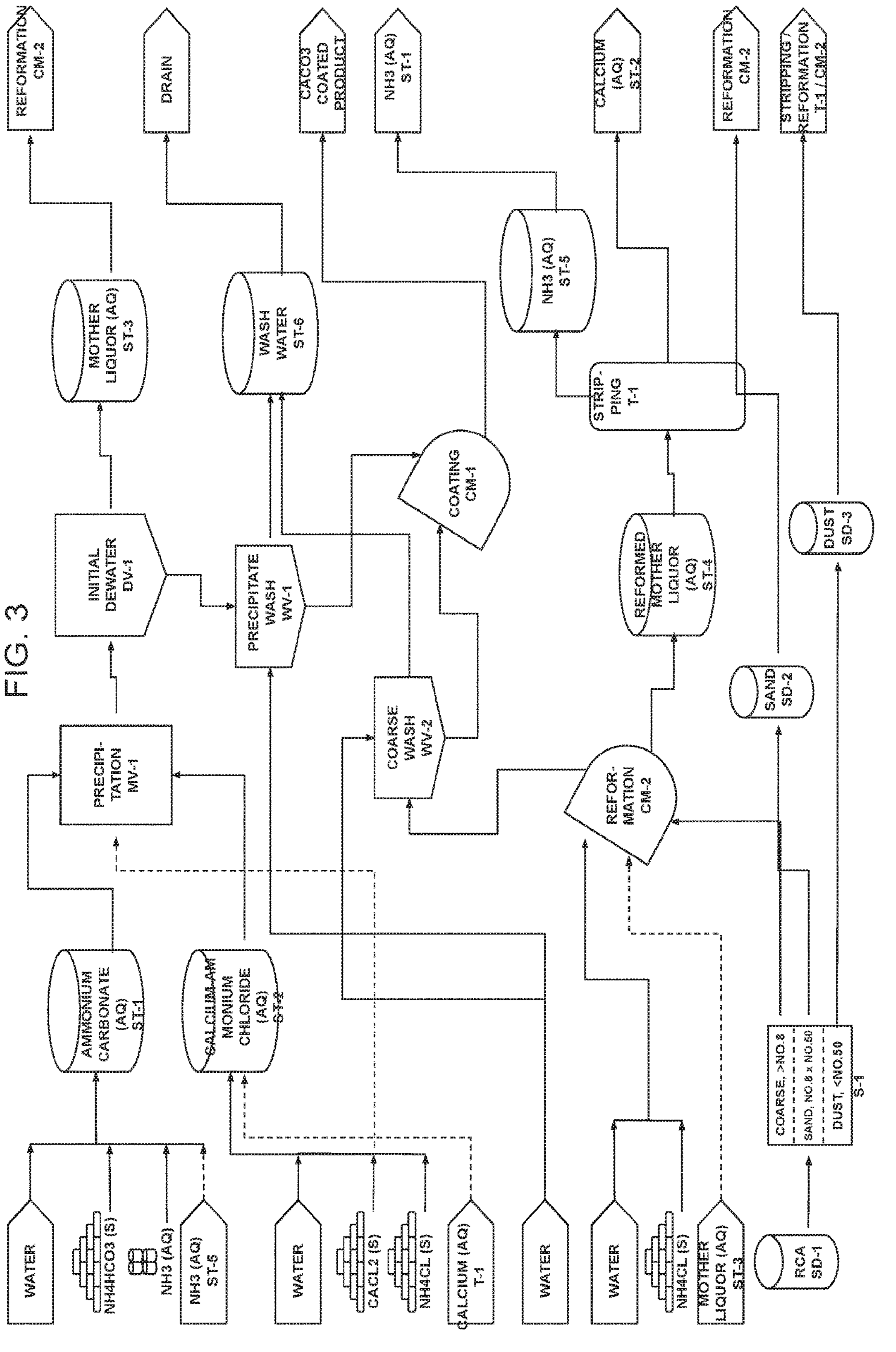
FIG. 3 provides a process flow chart of a method according to an embodiment of the invention, for example, where the combining a cation source and aqueous carbonate to produce a $CO_2$ sequestering carbonate precipitate is coupled to the preparation of a carbonate slurry to mix with an aggregate substrate to produce carbonate coated aggregate.

FIG. 3 provides a process flow chart of a method according to an embodiment of the invention, for example, where the combining a cation source and aqueous carbonate to produce a $CO_2$ sequestering carbonate precipitate is coupled to the preparation of a carbonate slurry to mix with an aggregate substrate to produce carbonate coated aggregate.

Figure 4:
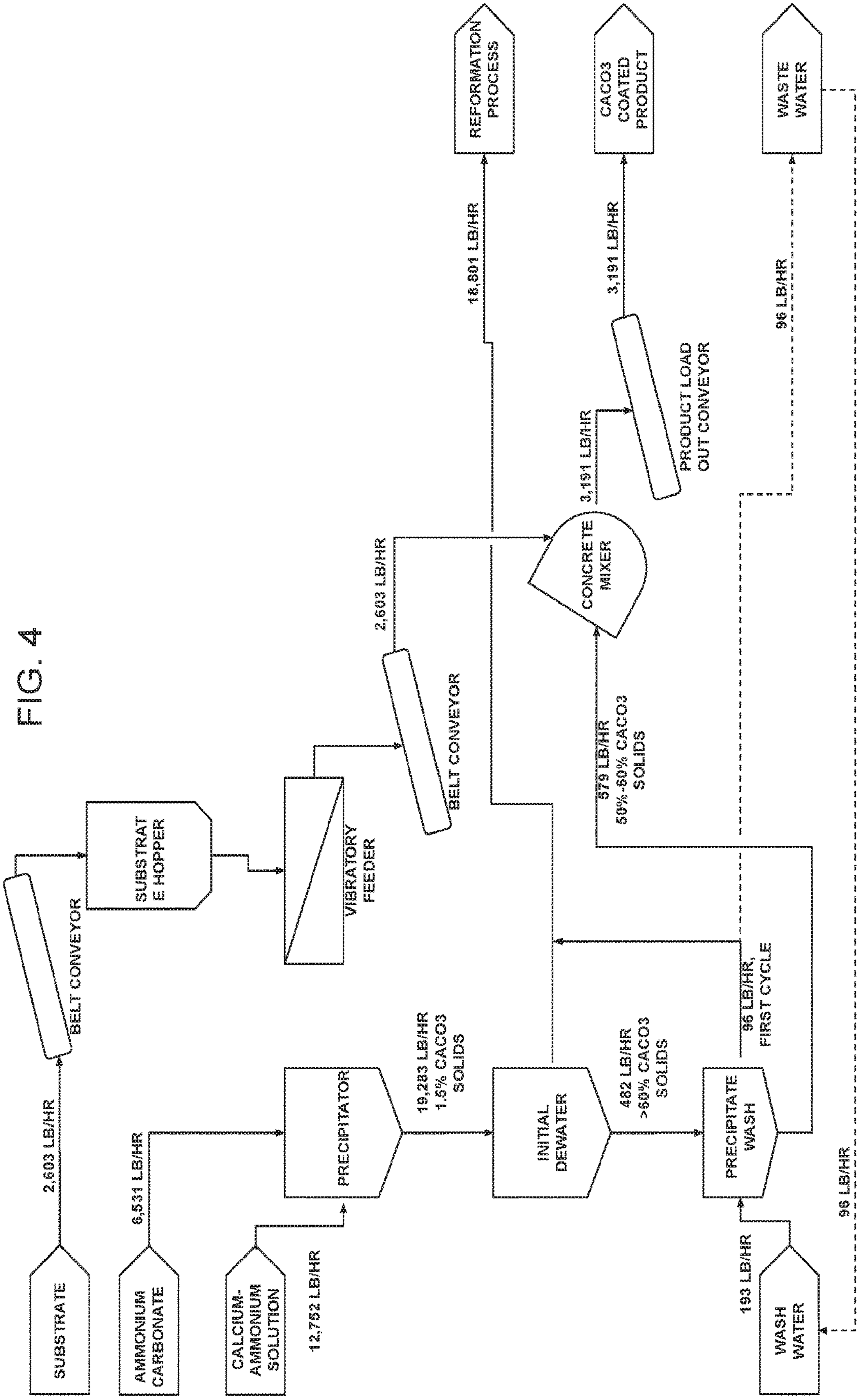
FIG. 4 provides a process flow diagram of a method according to an embodiment of the invention, where the combining an aqueous carbonate and a cation source to produce a $CO_2$ sequestering carbonate precipitate is coupled to the preparation of a carbonate slurry to mix with an aggregate substrate to produce carbonate coated aggregate.

FIG. 4 provides a process flow diagram of a method according to an embodiment of the invention, where the combining an aqueous carbonate and a cation source to produce a $CO_2$ sequestering carbonate precipitate is coupled to the preparation of a carbonate slurry to mix with an aggregate substrate to produce carbonate coated aggregate.

Concrete Dry Composites

Also provided are concrete dry composites that, upon combination with a suitable setting liquid (such as described below), produce a settable composition that sets and hardens into a concrete or a mortar. Concrete dry composites as described herein include an amount of a $CO_2$ sequestering aggregate, e.g., as described above, and a cement, such as a hydraulic cement. The term "hydraulic cement" is employed in its conventional sense to refer to a composition which sets and hardens after combining with water or a solution where the solvent is water, e.g., an admixture solution. Setting and hardening of the product produced by combination of the concrete dry composites of the invention with an aqueous liquid results from the production of hydrates that are formed from the cement upon reaction with water, where the hydrates are essentially insoluble in water.

Aggregates of the invention find use in place of conventional natural rock aggregates used in conventional concrete when combined with pure Portland cement. Other hydraulic cements of interest in certain embodiments are Portland cement blends. The phrase "Portland cement blend" includes a hydraulic cement composition that includes a Portland cement component and significant amount of a non-Portland cement component. As the cements of the invention are Portland cement blends, the cements include a Portland cement component. The Portland cement component may be any convenient Portland cement. As is known in the art, Portland cements are powder compositions produced by grinding Portland cement clinker (more than 90%), a limited amount of calcium sulfate which controls the set time, and up to 5% minor constituents (as allowed by various standards). When the exhaust gases used to provide carbon dioxide for the reaction contain SOx, then sufficient sulphate may be present as calcium sulfate in the precipitated material, either as a cement or aggregate to offset the need for additional calcium sulfate. As defined by the European Standard EN197.1, "Portland cement clinker is a hydraulic material which shall consist of at least two-thirds by mass of calcium silicates ($3CaO·SiO_2$ and $2CaO·SiO_2$), the remainder consisting of aluminium- and iron-containing clinker phases and other compounds. The ratio of CaO to $SiO_2$ shall not be less than 2.0. The magnesium content (MgO) shall not exceed 5.0% by mass." The concern about MgO is that later in the setting reaction, magnesium hydroxide, brucite, may form, leading to the deformation and weakening and cracking of the cement. In the case of magnesium carbonate containing cements, brucite will not form as it may with MgO. In certain embodiments, the Portland cement constituent of the present invention is any Portland cement that satisfies the ASTM Standards and Specifications of C150 (Types I-VIII) of the American Society for Testing of Materials (ASTM C50-Standard Specification for Portland Cement). ASTM C150 covers eight types of Portland cement, each possessing different properties, and used specifically for those properties.

Also of interest as hydraulic cements are carbonate containing hydraulic cements. Such carbonate containing hydraulic cements, methods for their manufacture and use are described in U.S. Pat. No. 7,735,274; the disclosure of which applications are herein incorporated by reference.

In certain embodiments, the hydraulic cement may be a blend of two or more different kinds of hydraulic cements, such as Portland cement and a carbonate containing hydraulic cement. In certain embodiments, the amount of a first cement, e.g., Portland cement in the blend ranges from 10 to 90% (w/w), such as 30 to 70% (w/w) and including 40 to 60% (w/w), e.g., a blend of 80% OPC and 20% carbonate hydraulic cement.

In some instances, the concrete dry composite compositions, as well as concretes produced therefrom, have a CarbonStar Rating (CSR) that is less than the CSR of the control composition that does not include an aggregate of the invention. The CarbonStar Rating (CSR) is a value that characterizes the embodied carbon (in the form of $CaCO_3$) for any product, in comparison to how carbon intensive production of the product itself is (i.e., in terms of the production $CO_2$). The CSR is a metric based on the embodied mass of $CO_2$ in a unit of concrete. Of the three components in concrete—water, cement and aggregate—cement is by far the most significant contributor to $CO_2$ emissions, roughly 1:1 by mass (1 ton cement produces roughly 1 ton $CO_2$). So, if a cubic yard of concrete uses 600 lb cement, then its CSR is 600. A cubic yard of concrete according to embodiments of the present invention which include 600 lb cement and in which at least a portion of the aggregate is carbonate coated aggregate, e.g., as described above, will have a CSR that is less than 600, e.g., where the CSR may be 550 or less, such as 500 or less, including 400 or less, e.g., 250 or less, such as 100 or less, where in some instances the CSR may be a negative value, e.g., −100 or less, such as −500 or less including −1000 or less, where in some instances the CSR of a cubic yard of concrete having 600 lbs cement may range from 500 to −5000, such as −100 to −4000, including −500 to −3000. To determine the CSR of a given cubic yard of concrete that includes carbonate coated aggregate of the invention, an initial value of $CO_2$ generated for the production of the cement component of the concrete cubic yard is determined. For example, where the yard includes 600 lbs of cement, the initial value of 600 is assigned to the yard. Next, the amount of carbonate coating in the yard is determined. Since the molecular weight of carbonate is 100 a.u., and 44% of carbonate is $CO_2$, the amount of carbonate coating is present in the yard is then multiplied by 0.44 and the resultant value subtracted from the initial value in order to obtain the CSR for the yard. For example, where a given yard of concrete mix is made up of 600 lbs of cement, 300 lbs of water, 1429 lbs of fine aggregate and 1739 lbs of coarse aggregate, the weight of a yard of concrete is 4068 lbs and the CSR is 600. If 10% of the total mass of aggregate in this mix is replaced by carbonate coating, e.g., as described above, the amount of carbonate present in the revised yard of concrete is 317 lbs. Multiplying this value by 0.44 yields 139.5. Subtracting this number from 600 provides a CSR of 460.5.

Settable Compositions

Settable compositions of the invention, such as concretes and mortars, are produced by combining a hydraulic cement with an amount of aggregate (fine for mortar, e.g., sand; coarse with or without fine for concrete) and water, either at the same time or by pre-combining the cement with aggregate, and then combining the resultant dry components with water. The choice of coarse aggregate material for concrete mixes using cement compositions of the invention may have a minimum size of about ⅜ inch and can vary in size from that minimum up to one inch or larger, including in gradations between these limits. Finely divided aggregate is smaller than ⅜ inch in size and again may be graduated in much finer sizes down to 200-sieve size or so. Fine aggregates may be present in both mortars and concretes of the invention. The weight ratio of cement to aggregate in the dry components of the cement may vary, and in certain embodiments ranges from 1:10 to 4:10, such as 2:10 to 5:10 and including from 55:1000 to 70:100.

The liquid phase, e.g., aqueous fluid, with which the dry component is combined to produce the settable composition, e.g., concrete, may vary, from pure water to water that includes one or more solutes, additives, co-solvents, etc., as desired. The ratio of dry component to liquid phase that is combined in preparing the settable composition may vary, and in certain embodiments ranges from 2:10 to 7:10, such as 3:10 to 6:10 and including 4:10 to 6:10.

In certain embodiments, the cements may be employed with one or more admixtures. Admixtures are compositions added to concrete to provide it with desirable characteristics that are not obtainable with basic concrete mixtures or to modify properties of the concrete to make it more readily useable or more suitable for a particular purpose or for cost reduction. As is known in the art, an admixture is any material or composition, other than the hydraulic cement, aggregate and water, that is used as a component of the concrete or mortar to enhance some characteristic, or lower the cost, thereof. The amount of admixture that is employed may vary depending on the nature of the admixture. In certain embodiments the amounts of these components range from 1 to 50% w/w, such as 2 to 10% w/w.

Admixtures of interest include finely divided mineral admixtures such as cementitious materials; pozzolans; pozzolanic and cementitious materials; and nominally inert materials. Pozzolans include diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Nominally inert materials can also include finely divided raw quartz, dolomites, limestone, marble, granite, and others. Fly ash is defined in ASTM C618.

Other types of admixture of interest include plasticizers, accelerators, retarders, air-entrainers, foaming agents, water reducers, corrosion inhibitors, and pigments.

As such, admixtures of interest include, but are not limited to: set accelerators, set retarders, air-entraining agents, defoamers, alkali-reactivity reducers, bonding admixtures, dispersants, coloring admixtures, corrosion inhibitors, dampproofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, and any other concrete or mortar admixture or additive. Admixtures are well-known in the art and any suitable admixture of the above type or any other desired type may be used; see, e.g., U.S. Pat. No. 7,735,274, incorporated herein by reference in its entirety.

In some instances, the settable composition is produced using an amount of a bicarbonate rich product (BRP) admixture, which may be liquid or solid form, e.g., as described in U.S. patent application Ser. No. 14/112,495 published as United States Published Application Publication No. 2014/0234946; the disclosure of which is herein incorporated by reference.

In certain embodiments, settable compositions of the invention include a cement employed with fibers, e.g., where one desires fiber-reinforced concrete. Fibers can be made of zirconia containing materials, steel, carbon, fiberglass, or synthetic materials, e.g., polypropylene, nylon, polyethylene, polyester, rayon, high-strength aramid, (i.e. Kevlar®), or mixtures thereof.

The components of the settable composition can be combined using any convenient protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

Following the combination of the components to produce a settable composition (e.g., concrete), the settable composition are in some instances initially flowable compositions, and then set after a given period of time. The setting time may vary, and in certain embodiments ranges from 30 minutes to 48 hours, such as 30 minutes to 24 hours and including from 1 hour to 4 hours.

The strength of the set product may also vary. In certain embodiments, the strength of the set cement may range from 5 Mpa to 70 MPa, such as 10 MPa to 50 MPa and including from 20 MPa to 40 MPa. In certain embodiments, set products produced from cements of the invention are extremely durable. e.g., as determined using the test method described at ASTM C1157.

Structures

Aspects of the invention further include structures produced from the aggregates and settable compositions of the invention. As such, further embodiments include manmade structures that contain the aggregates of the invention and methods of their manufacture. Thus in some embodiments the invention provides a manmade structure that includes one or more aggregates as described herein. The manmade structure may be any structure in which an aggregate may be used, such as a building, dam, levee, roadway or any other manmade structure that incorporates an aggregate or rock. In some embodiments, the invention provides a manmade structure, e.g., a building, a dam, or a roadway, that includes an aggregate of the invention that contains $CO_2$ from a fossil fuel source. In some embodiments the invention provides a method of manufacturing a structure, comprising providing an aggregate of the invention that contains $CO_2$ from a fossil fuel source. Because these structures are produced from aggregates and/or settable compositions of the invention, they will include markers or components that identify them as being produced by a bicarbonate mediated $CO_2$ sequestration protocol.

Utility

The subject aggregate compositions and settable compositions that include the same, find use in a variety of different applications, such as above ground stable $CO_2$ sequestration products, as well as building or construction materials. Specific structures in which the settable compositions of the invention find use include, but are not limited to: pavements, architectural structures, e.g., buildings, foundations, motorways/roads, overpasses, parking structures, brick/block walls and footings for gates, fences and poles. Mortars of the invention find use in binding construction blocks, e.g., bricks, together and filling gaps between construction blocks. Mortars can also be used to fix existing structure, e.g., to replace sections where the original mortar has become compromised or eroded, among other uses.

The following examples are offered by way of illustration and not by way of limitation.

EXPERIMENTAL

A. Carbonate Slurry Preparation

1) Combine calcium containing solution from reformation-distillation process with $(NH_4)_2CO_3/NH_4HCO_3$ solution as a dump reaction (Details may be found in PCT/US2017/024146 published as WO 2017/165849, disclosure of which is herein incorporated by reference).
   a. The order does not matter
   b. The concentrations of the solutions do not affect coating and precipitation yields
   c. The pH of carbonate solution does not affect coating but may affect the carbonate concentration due to limited solubility of $NH_4HCO_3$ (must be below 1M with $NH_4HCO_3$ solution).
2) After 30 min-1 hour of settling, the $CaCO_3$ slurry is dewatered as much as possible using a vacuum pump or hydrocyclone. The filtrate is saved and is used to reform ammonia in the presence of geomass, e.g., recycled concrete aggregate (RCA).
3) The dewatered $CaCO_3$ is combined with fresh water (1:5 $CaCO_3$ precipitate to water volume ratio) and gently stirred for 20 seconds. And then the mixture is sonicated for 8 minutes.
4) The mixture is dewatered as much as possible using a vacuum pump, hydrocyclone, decanter centrifuge, etc. The filtrate may be discarded.
5) Repeat (3)
6) Repeat (4)
7) Fresh water is added (normally ~15 wt % of the dewatered cake) to the filtered $CaCO_3$ cake to achieve desired solid content (~55%) of the $CaCO_3$ slurry.

8) The cake+water mixture is thoroughly mixed to form a homogeneous yogurt-like slurry. The age of the slurry does not exceed 3 hours.

9) Infrared characterization of the wet slurry shows amorphous calcium carbonate (ACC) and vaterite morphologies.

B. Use of a carbonate slurry to prepare carbonate coated aggregate

1) Aggregate substrate rocks and $CaCO_3$ slurry are placed inside a rotating concrete mixer (i.e., rotating drum)

2) The concrete mixer is rotated for 15 min-3 hours with an aerated heater (e.g., ambient headspace at 29° C. and rock surface at 26° C.) until the coated aggregate surface is relatively dry and smooth (should not come off when touched with fingers). If the coating passes this stage, the coating will start to become powdery and very weak.

3) Optionally in place of applying heat, the coated aggregates are taken out and dried in the air overnight.

C. Use of a carbonate slurry to prepare carbonate aggregate

1) $CaCO_3$ slurry is placed inside a rotating concrete mixer.

2) The concrete mixer is rotated for 15 min-3 hours with an aerated heater (e.g., ambient headspace at 29° C. and rock surface at 26° C.)

3) Depending on the mixing vessel, the pieces of agglomerated slurry are constantly scraped off manually to prevent caking; an air knife would also work.

4) Agglomerated pieces are formed and when the surface is relatively dry and smooth (should not come off when touched with fingers), the agglomerated aggregates are taken out and dried in the air overnight (this step may not be necessary if the aggregates can be used slightly wet, e.g., in a surface saturated dry (SSD) state).

D. Results

FIG. 5 shows a table of data for aggregate compositions produced by an embodiment of the method, where the method comprises mixing a carbonate slurry and a fine aggregate substrate to produce a carbonate coated aggregate. In this embodiment, upcycled recycled concrete aggregate (RCA) fines were used as the substrate (Sample No. 1 in FIG. 5), and were produced by an embodiment of the method, for example, as described above and as illustrated further in FIGS. 1 and 2, using untreated RCA fines as raw material that was sourced from suppliers in the Bay Area, California, USA. The raw material was first mixed with ammonium chloride solution to produce reformed ammonium chloride solution and upcycled geomass aggregate, i.e., upcycled RCA fines, the latter of which was then washed and dried prior to its use as the substrate to produce a carbonate coated aggregate. As shown in FIG. 5, Sample No.'s 2 through 8 represent different embodiments of the method described above. For each sample, the substrate described above was mixed with a carbonate slurry, prepared by an embodiment of the method where the method combined ammonium carbonate solution with a calcium-ammonium chloride solution to produce a $CO_2$ sequestering carbonate precipitate. The carbonate slurry was combined with different quantities of substrate, e.g., different ratios of slurry to substrate, e.g., 1:1, 1:2, 1:4, 1:6, etc., in a concrete mixer, i.e., a mixing drum, for between 15 and 120 minutes. During mixing the agglomerated mixture was periodically broken apart manually until it no longer agglomerated. After mixing the carbonate coated aggregate product was left to cure in open atmosphere under ambient conditions. In one instance, for example, Sample No. 2 yielded a carbonate coated aggregate that was 23% calcium carbonate ($CaCO_3$); the gradation changed from No. 4×No. 100 (before coating) to ½"×No. 50 (after coating); the absorption increased from 6.3% to 13%; and the bulk surface saturated density (SSD) decreased from 2.38 to 2.3. Another instance, for example, Sample No. 8 in FIG. 5, yielded a carbonate coated aggregate that was 60% $CaCO_3$; the gradation changed from No. 4×No. 100 (before coating) to ¾"×No. 8 (after coating); the absorption increased from 6.3% to 15%; and the bulk SSD decreased from 2.38 to 2.33. The aggregate compositions tabulated in FIG. 5 are examples of carbonate coated aggregate that may be produced from some embodiments of the method.

Figure 6:
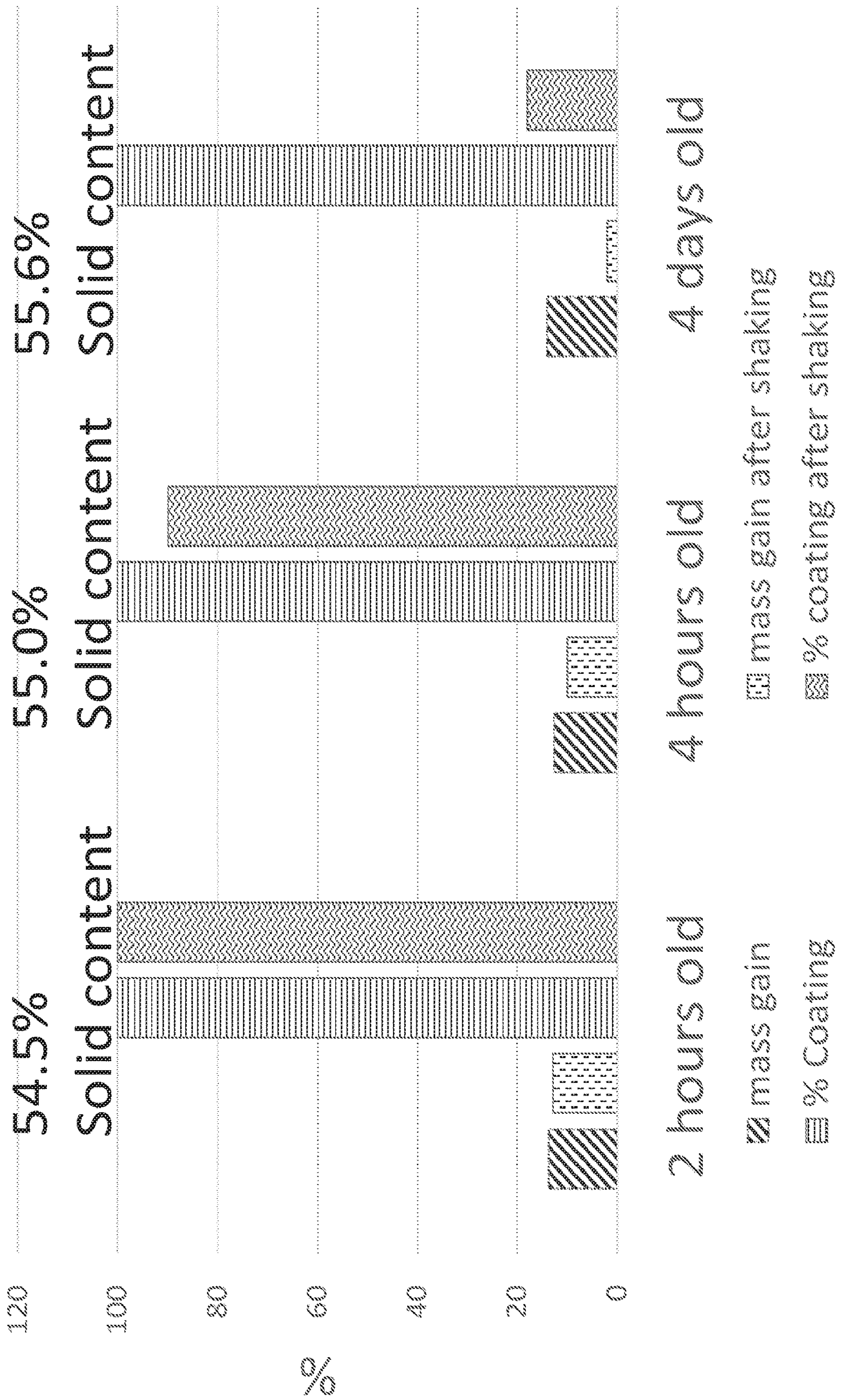
FIG. 6 shows the effects of the age of the carbonate slurry as it relates to properties of the carbonate coated aggregate, produced by an embodiment of the method.

FIG. 6 exemplifies how the age of the carbonate slurry relates to some embodiments of the method. Three separate carbonate slurries, roughly 55% solids, were prepared, e.g., as described above, and each slurry was used to produce carbonate coated aggregate. In one embodiment of the method to produce carbonate coated aggregate, the carbonate slurry was 2 hours old prior to mixing with an aggregate substrate. In another embodiment of the method to produce carbonate coated aggregate, the carbonate slurry was 4 hours old prior to mixing with an aggregate substrate. In a third embodiment of the method to produce carbonate coated aggregate, the carbonate slurry was 96 hours (4 days) old prior to mixing with an aggregate substrate. There is a noticeable difference that suggests that older carbonate slurries will lead to lower quality carbonate coated aggregate. The testing methods used in FIG. 6 are as follows:

Mass gain: calculates % weight gain after drying; weight gain is considered as $CaCO_3$ loading. For example, the weight of 100 g uncoated aggregate after coating/drying was increased to 150 g->50% weight gain % Coating: based on mass gain (amount of $CaCO_3$ on aggregates), calculates how much $CaCO_3$ was loaded onto aggregates based on the starting $CaCl_2$) and $(NH_4)_2CO_3$ concentrations % Coating after shaking: a relative durability test; the coated-dried aggregates are placed into sieve shaker and shaken vigorously for 75 sec. This will allow weakly attached coating to fall off.

Mass gain after shaking: calculates the % weight loss compared to freshly coated-dried aggregates before shaking.

Figure 7:
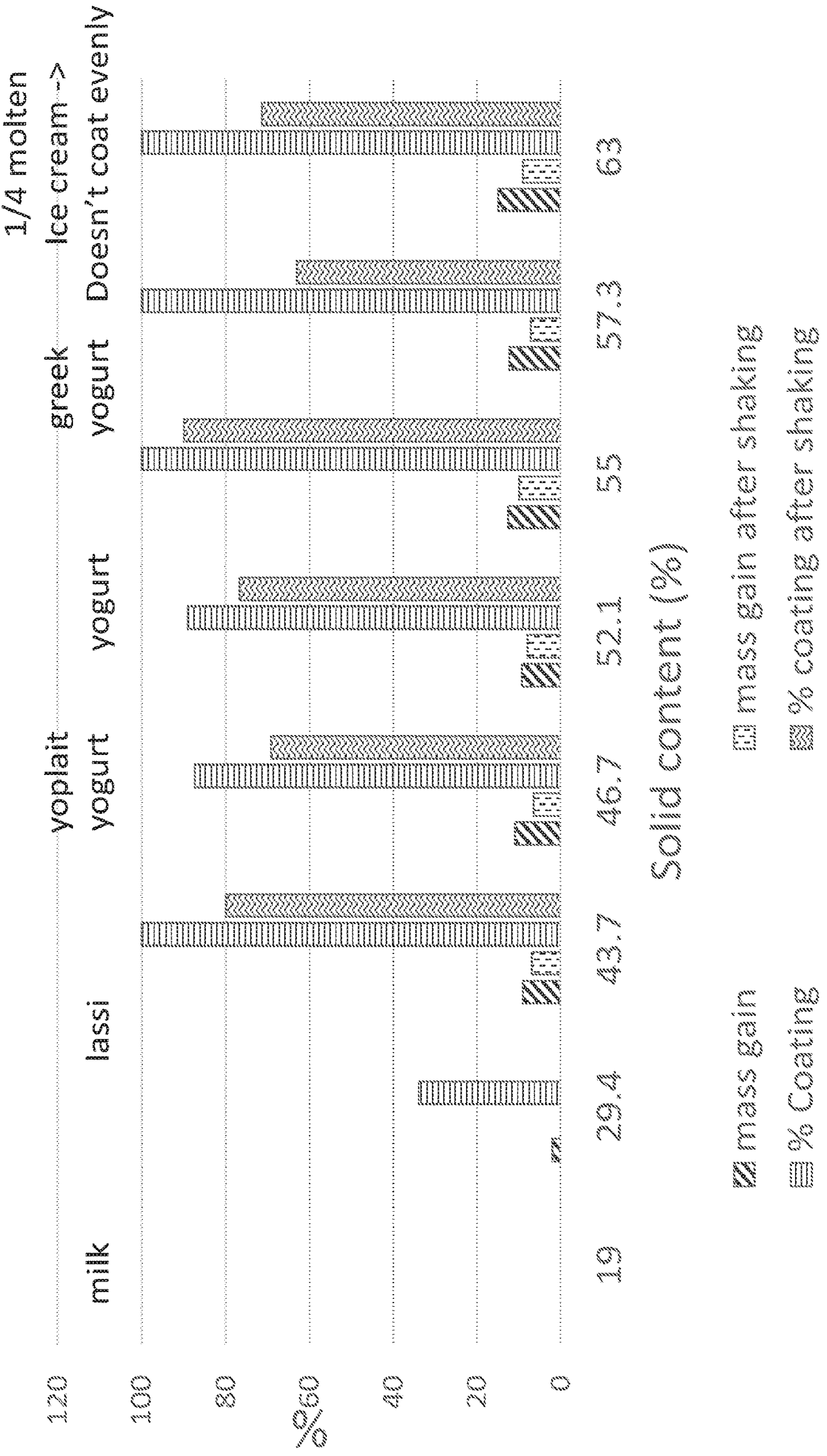
FIG. 7 illustrates the effect of solid content of the carbonate slurry as it relates to properties of the carbonate coated aggregate, produced by an embodiment of the method.

FIG. 7 illustrates the effect of the % solids content in the carbonate slurry as it relates to the production of carbonate coated aggregate by an embodiment of the method, e.g., as described above. The solid content in various carbonate slurries in FIG. 7 ranges from 19% to 63% solids, having consistencies described as "milk" to "molten ice cream", respectively. What the data in FIG. 9 suggest are that the target solid content in the carbonate slurry is in the range of roughly 45% to 55% solids for these embodiments of the method to produce carbonate coated aggregate.

Figure 8:
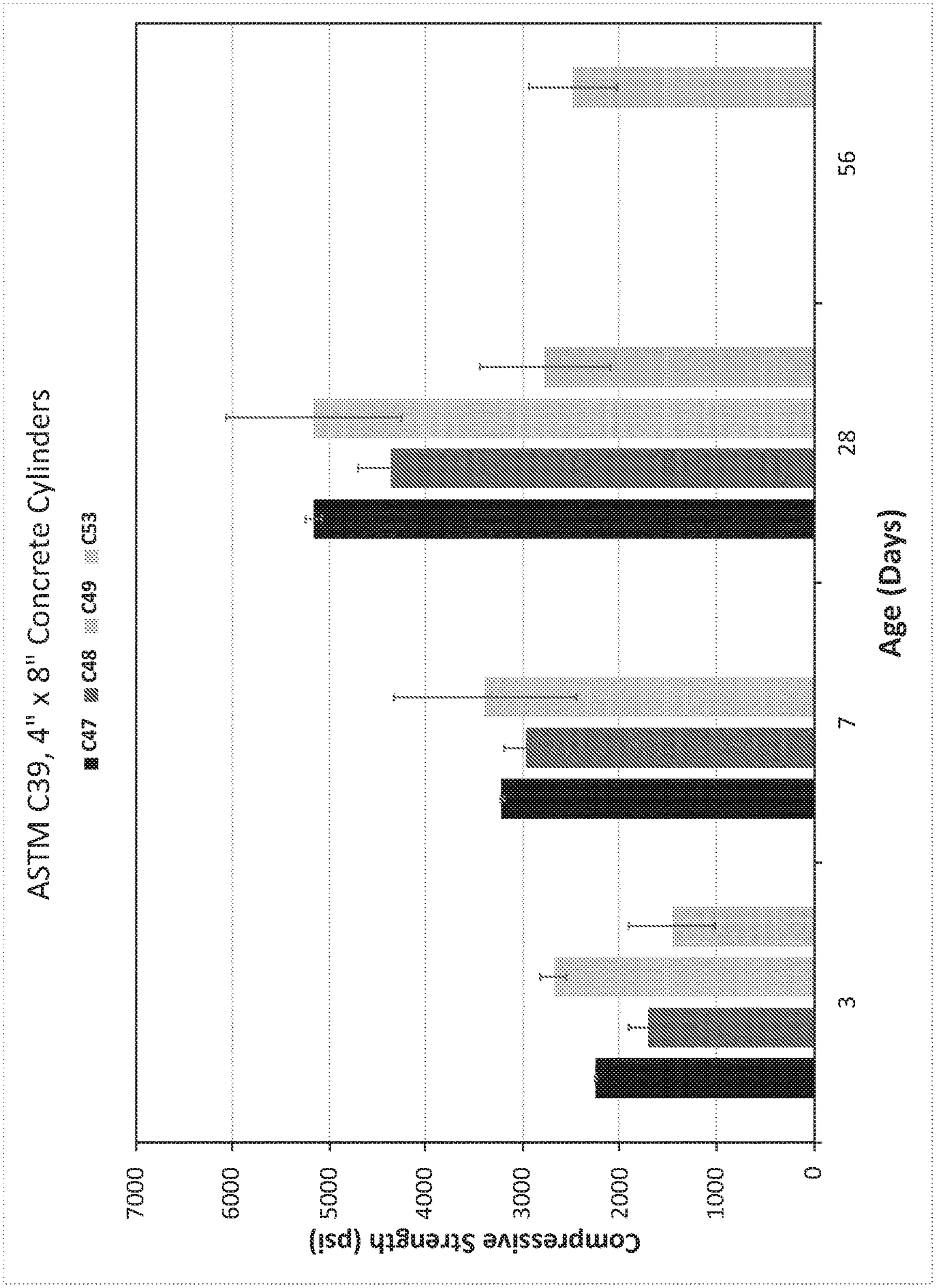
FIG. 8 shows compressive strength data for concrete compositions that were formulated with aggregate compositions produced by an embodiment of the method, where the method comprises mixing the carbonate slurry and an aggregate substrate to produce a carbonate coated aggregate.
Figure 9:
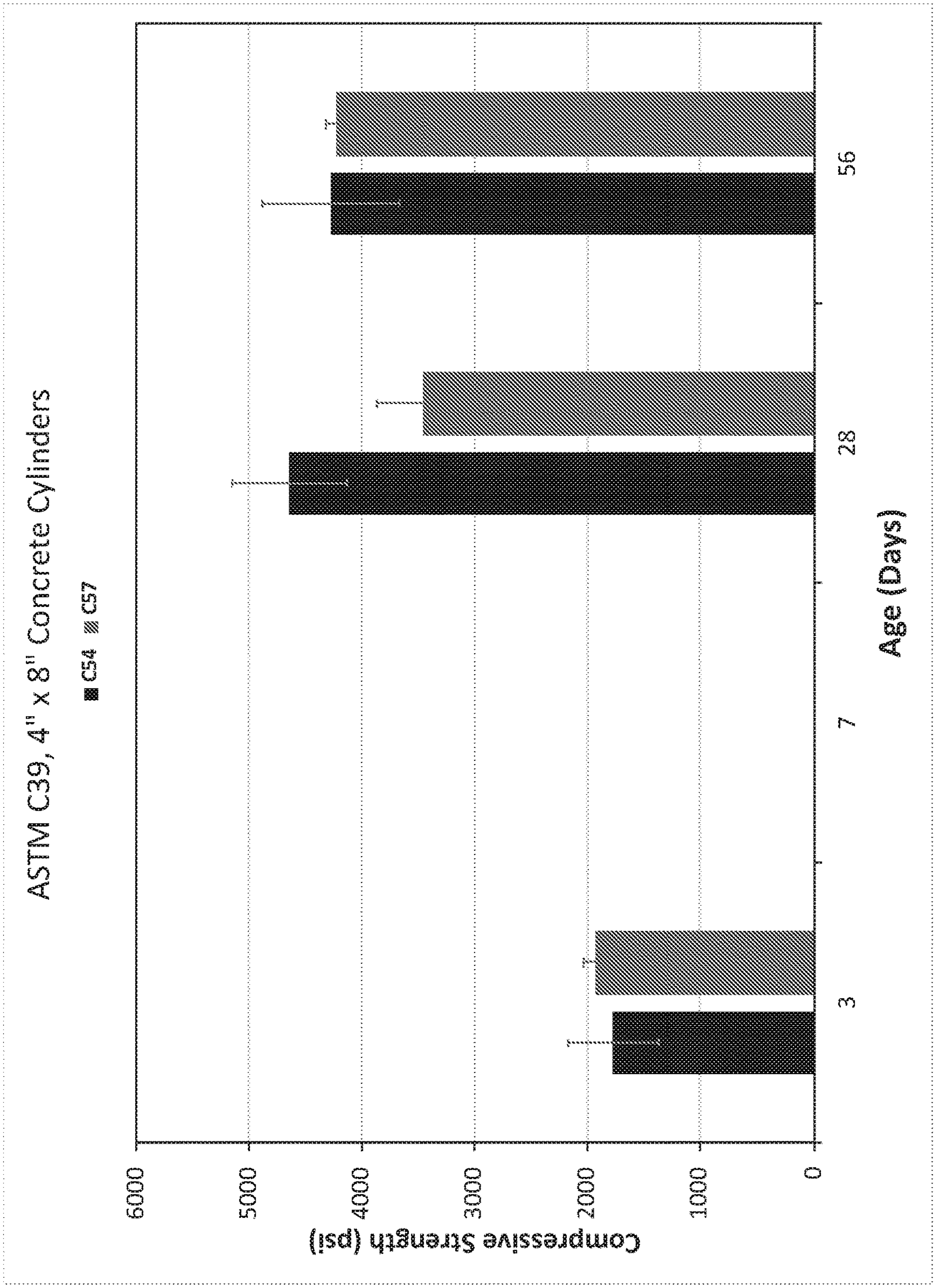
FIG. 9 shows compressive strength data for concrete compositions that were formulated with aggregate compositions produced by an embodiment of the method, where the method comprises mixing the carbonate slurry to produce a carbonate aggregate.

FIGS. 8-9 exemplify concrete dry composites composed of carbonate coated aggregates and carbonate aggregates, respectively, produced by an embodiment of the method, where the method comprises producing a $CO_2$ sequestering carbonate precipitate from a $CO_2$ sequestering process, e.g., as described above. FIG. 8 shows compressive strength data of 4"×8" cylinders of concrete dry composites that used a $CO_2$ sequestering aggregate produced by an embodiment of the invention, e.g., as described above, in combination with sand, cement, supplementary cementitious material (SCM) and water. Concrete dry composite specimens C47, C48 & C49 in FIG. 8 were prepared with coarse $CO_2$ sequestering aggregate that was 9.5% $CaCO_3$ and used coarse upcycled RCA as the substrate, which was produced, e.g., as described above. In each of the concrete dry composites C47, C48 & C49 in FIG. 8, 100% of conventional coarse aggregate was replaced by the coarse $CO_2$ sequestering aggregate; the balance of materials in the concrete dry composite specimens used (i) sand, Orca sand for C47, upcycled RCA sand for C48 & C49, (ii) Type II/V Portland cement, (iii) 25% replacement of Portland cement by SCM, fly ash for C47 & C48 and slag cement for C49. Each of the specimens achieved greater than 4,000 psi compressive strength after 28 days of curing, with C47 & C49 achieving greater than 5,000 psi compressive strength at 28 days.

FIG. 8 also shows the compressive strength data of 4"×8" cylinders of a concrete dry composite, C53, that used coarse composite carbonate aggregate as the $CO_2$ sequestering aggregate. In this instance, the $CO_2$ sequestering aggregate was produced by an embodiment of the invention, e.g., as described above, where the carbonate slurry was combined with upcycled RCA fines, e.g., fines passing 100% through a No. 100 (0.149 mm) sieve screen, in a concrete mixing drum to produce coarse composite carbonate aggregate that was, e.g., four (4) parts by mass upcycled RCA fines and, e.g., nine (9) parts by mass $CaCO_3$. The coarse composite aggregate in specimen C53 was combined with coarse upcycled RCA, Orca sand, Type II/V Portland cement and water to produce the concrete dry composite.

The compressive strength data of 4"×8" cylinders of concrete dry composite specimens C54 & C57 are shown in FIG. 9. These composites used 100% $CaCO_3$ agglomerated aggregates as the $CO_2$ sequestering aggregate, along with sand, cement and water. The carbonate aggregates were produced according to an embodiment of the invention, where the method comprised mixing ammonium carbonated solution with a calcium-ammonium containing solution to produce a $CO_2$ sequestered carbonate precipitate. Once washed and dewatered, e.g., as described above in certain embodiments of the methods, the carbonate slurry was introduced to a concrete mixing drum, i.e., a device causing a rotating action to facilitate agglomeration. The agglomerated mixture in the mixing drum was periodically broken apart manually until it no longer agglomerated. The carbonate aggregate that was produced was removed from the mixing drum and allowed to cure, i.e., to dry, in open atmosphere under ambient conditions. Concrete dry composite C54 used 100% $CaCO_3$ agglomerated aggregate as described above, coarse upcycled RCA, Orca sand, Type II/V Portland cement and water, and achieved over 4,000 psi after 28 days of curing. Concrete dry composite C57 used 100% $CaCO_3$ agglomerated aggregate as described above, except that the aggregate was manually crushed to meet the gradation of ⅜"×No. 8, and it replaced 100% of the conventional coarse aggregate, Orca sand, Type II/V cement and water, and achieved over 4,000 psi after 56 days of curing.

Notwithstanding the appended claims, the disclosure is also defined by the following clauses:

1. A method of producing a carbonate coated aggregate, the method comprising:
   preparing a carbonate slurry;
   introducing the carbonate slurry and an aggregate substrate into a revolving drum; and
   mixing the carbonate slurry and aggregate substrate in the revolving drum under conditions sufficient to produce a carbonate coated aggregate.
2. The method according to Clause 1, wherein the carbonate slurry is a slurry of metal carbonate particles.
3. The method according to Clause 2, wherein the metal carbonate particles are calcium carbonate particles.
4. The method according to Clause 2, wherein the metal carbonate particles are calcium magnesium carbonate particles.

5. The method according to Clauses 3 or 4, wherein the carbonate particles comprise sequestered $CO_2$.
6. The method according to any of the preceding clauses, wherein the carbonate slurry comprises 40 to 60% solids.
7. The method according to any of the preceding clauses, wherein the slurry has a viscosity ranging from 2 to 300,000 centipoise.
8. The method according to any of the preceding clauses, wherein the carbonate slurry is prepared using a $CO_2$ sequestering process.
9. The method according to Clause 8, wherein the $CO_2$ sequestering process comprises:
   a) contacting an aqueous capture liquid with a gaseous source of $CO_2$ under conditions sufficient to produce an aqueous carbonate; and then combining a cation source and the aqueous carbonate under conditions sufficient to produce a $CO_2$ sequestering carbonate precipitate; or
   b) contacting an aqueous ammonia capture liquid that includes a cation source with the gaseous source of $CO_2$ under conditions sufficient to produce the $CO_2$ sequestering carbonate.
10. The method according to Clause 9, wherein the aqueous capture liquid comprises an aqueous capture ammonia and optionally an additive.
11. The method according to any of Clauses 9 to 10, wherein the method comprises washing the precipitate.
12. The method according to any of the preceding clauses, wherein the slurry comprises an additive.
13. The method according to Clause 12, wherein the additive is selected from the group consisting of polymers (ex. polyvinyl acetate adhesives), organic/inorganic adhesives (ex. epoxy, silicate glue, concrete adhesives), and cement admixtures and combinations thereof.
14. The method according to any of the preceding clauses, wherein the aggregate substrate comprises fine substrate particles.
15. The method according to any of the preceding clauses, wherein the aggregate substrate comprises coarse substrate particles.
16. The method according to any of the preceding clauses, wherein the aggregate comprises a lightweight aggregate.
17. The method according to any of the preceding clauses, wherein the substrate aggregate comprises an agglomeration of fine aggregates bound together by the method according to any of the preceding clauses.
18. The method according to any of the preceding clauses, wherein the aggregate substrate comprises a naturally occurring aggregate.
19. The method according to any of Clauses 1 to 17, wherein the aggregate substrate comprises remediated recycled concrete.
20. The method according to any of the preceding clauses, wherein the method comprises introducing the carbonate slurry and aggregate substrate into the revolving drum and commencing mixing within 4 hours of preparing the carbonate slurry.
21. The method according any of the preceding clauses, wherein the carbonate slurry and aggregate substrate are mixed in the rotating mixture for a time ranging from 10 min to 5 hrs.
22. The method according to any of the preceding clauses, wherein the method further comprises drying and/or curing the carbonate coated aggregate.

23. The method according to any of the preceding clauses, wherein the carbonate coated aggregate comprises a carbonate coating having a thickness ranging from 0.1 μm to 50 mm.
24. The method according to any of the preceding clauses, wherein the carbonate coated aggregate comprises a carbonate coating having a Mohs hardness ranging from 2 to 6.
25. The method according to any of Clauses 1 to 24, wherein the method is performed in 1 hour or less.
26. A carbonate coated aggregate composition produced according to any of Clauses 1 to 25.
27. A concrete dry composite comprising:
(a) a cement; and
(b) an aggregate composition according to Clause 26.
28. The concrete dry composite according to Clause 27, wherein the cement comprises a hydraulic cement.
29. The concrete dry composite according to Clause 28, wherein the hydraulic cement comprises a Portland cement.
30. A settable composition produced by combining an aggregate according to Clause 26, a cement and a liquid.
31. The settable composition according to Clause 30, wherein the cement is a hydraulic cement.
32. The settable composition according to Clause 31, wherein the hydraulic cement comprises a Portland cement.
33. The settable composition according to any of Clauses 30 to 32, further comprising a supplementary cementitious material.
34. The settable composition according to any of Clauses 30 to 33, further comprising an admixture.
35. The settable composition according to any of Clauses 30 to 34, wherein the settable composition is flowable.
36. A solid formed structure produced from a settable composition according to any of Clauses 30 to 35.
37. A method comprising combining an aggregate according to Clause 26, a cement and a liquid in a manner sufficient to produce a settable composition that sets into a solid product.
38. The method according to Clause 37, wherein the liquid comprises an aqueous liquid.
39. A method of producing a carbonate aggregate, the method comprising:
preparing a carbonate slurry;
introducing the carbonate slurry into a revolving drum; and
mixing the carbonate slurry in the revolving drum under conditions sufficient to produce a carbonate aggregate.
40. The method according to Clause 39, wherein the carbonate slurry is a slurry of metal carbonate particles.
41. The method according to Clause 40, wherein the metal carbonate particles are calcium carbonate particles.
42. The method according to Clause 40, wherein the metal carbonate particles are calcium magnesium carbonate particles.
43. The method according to Clauses 40 to 42, wherein the carbonate particles comprise sequestered $CO_2$.
44. The method according to any of Clauses 39 to 43, wherein the carbonate slurry comprises 40 to 60% solids.
45. The method according to any of Clauses 39 to 44, wherein the slurry has a viscosity ranging from 2 to 300,000 centipoise.
46. The method according to any of Clauses 39 to 45, wherein the carbonate slurry is prepared using a $CO_2$ sequestering process.
47. The method according to Clause 46, wherein the $CO_2$ sequestering process comprises:
a) contacting an aqueous capture liquid with a gaseous source of $CO_2$ under conditions sufficient to produce an aqueous carbonate; and then combining a cation source and the aqueous carbonate under conditions sufficient to produce a $CO_2$ sequestering carbonate precipitate; or
b) contacting an aqueous ammonia capture liquid that includes a cation source with the gaseous source of $CO_2$ under conditions sufficient to produce the $CO_2$ sequestering carbonate.
48. The method according to Clause 47, wherein the aqueous capture liquid comprises an aqueous capture ammonia and optionally an additive.
49. The method according to any of Clauses 47 to 48, wherein the method comprises washing the precipitate.
50. The method according to any of Clauses 39 to 49, wherein the method is performed in 1 hour or less.
51. A method of producing a carbonate aggregate, the method comprising:
preparing a carbonate slurry; and
subjecting the carbonate slurry to rotational action under conditions sufficient to produce a carbonate aggregate product.
52. The method according to Clause 51, wherein the carbonate slurry is a slurry of metal carbonate particles.
53. The method according to Clause 52, wherein the metal carbonate particles are calcium carbonate particles.
54. The method according to Clause 53, wherein the metal carbonate particles are calcium magnesium carbonate particles.
55. The method according to Clauses 51 to 54, wherein the carbonate particles comprise sequestered $CO_2$.
56. The method according to any of Clauses 51 to 55, wherein the carbonate slurry comprises 40 to 60% solids.
57. The method according to any of Clauses 51 to 56, wherein the slurry has a viscosity ranging from 2 to 300,000 centipoise.
58. The method according to any of Clauses 51 to 57, wherein the carbonate slurry is prepared using a $CO_2$ sequestering process.
59. The method according to Clause 58, wherein the $CO_2$ sequestering process comprises:
a) contacting an aqueous capture liquid with a gaseous source of $CO_2$ under conditions sufficient to produce an aqueous carbonate; and then combining a cation source and the aqueous carbonate under conditions sufficient to produce a $CO_2$ sequestering carbonate precipitate; or
b) contacting an aqueous ammonia capture liquid that includes a cation source with the gaseous source of $CO_2$ under conditions sufficient to produce the $CO_2$ sequestering carbonate.
60. The method according to Clause 59, wherein the aqueous capture liquid comprises an aqueous capture ammonia and optionally an additive.
61. The method according to any of Clauses 59 to 60, wherein the method comprises washing the precipitate.
62. The method according to any of Clauses 59 to 61, wherein the method is performed in 1 hour or less.
63. The method according to any of Clauses 51 to 61, wherein the carbonate slurry is subjected to the rotational action in combination with an aggregate substrate and the carbonate aggregate product comprises carbonate coated aggregate.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method of producing a carbonate aggregate, the method comprising:

preparing a carbonate slurry comprising 40% to 60% carbonate solids, wherein the carbonate slurry is prepared using a $CO_2$ sequestering process, wherein the $CO_2$ sequestering process comprises:

producing a $CO_2$ sequestering carbonate precipitate by:

a) contacting an aqueous capture liquid with a gaseous source of $CO_2$ to produce an aqueous carbonate; and then combining a cation source and the aqueous carbonate to produce the $CO_2$ sequestering carbonate precipitate; or b) contacting an aqueous ammonia capture liquid that includes a cation source with the gaseous source of $CO_2$ to produce the $CO_2$ sequestering carbonate precipitate; and washing the $CO_2$ sequestering carbonate precipitate; and subjecting the carbonate slurry to rotational action to produce the carbonate aggregate product via agglomeration.

2. The method according to claim 1, wherein the carbonate slurry is a slurry of metal carbonate particles.

3. The method according to claim 2, wherein the metal carbonate particles are calcium carbonate particles.

4. The method according to claim 3, wherein the metal carbonate particles are calcium magnesium carbonate particles.

5. The method according to claim 1, wherein the carbonate slurry has a viscosity ranging from 2 to 300,000 centipoise.

6. The method according to claim 1, wherein the aqueous capture liquid comprises an aqueous capture ammonia and optionally an additive.

7. The method according to claim 1, wherein the carbonate slurry is subjected to the rotational action in combination with an aggregate substrate and the carbonate aggregate product comprises carbonate coated aggregate.

8. The method according to claim 1, wherein the method comprises introducing the carbonate slurry into a revolving drum and subjecting the carbonate slurry to rotational action in the revolving drum.

9. The method according to claim 1, wherein the method comprises subjecting the carbonate slurry to rotational action to produce a carbonate aggregate product exhibiting a hardness on the Mohs scale ranging from 2 to 6.

10. The method according to claim 1, wherein the method comprises subjecting the carbonate slurry to rotational action to produce a carbonate aggregate product exhibiting a density ranging from 0.6 gm/cc to 5 gm/cc.

11. The method according to claim 1, wherein the carbonate slurry comprises about 55% carbonate solids.

12. The method according to claim 1, wherein subjecting the carbonate slurry to rotational action further comprises applying heat.

* * * * *